United States Patent
Coulombe et al.

(10) Patent No.: US 8,983,206 B2
(45) Date of Patent: Mar. 17, 2015

(54) METHOD AND SYSTEM FOR INCREASING ROBUSTNESS OF VISUAL QUALITY METRICS USING SPATIAL SHIFTING

(75) Inventors: Stephane Coulombe, Brossard (CA); Soroosh Rezazadeh, Montreal (CA)

(73) Assignee: Ecole de Techbologie Superieure, Montreal (CA)

(*) Notice: Subject to any disclaimer, the term of this patent is extended or adjusted under 35 U.S.C. 154(b) by 338 days.

(21) Appl. No.: 13/463,733

(22) Filed: May 3, 2012

(65) Prior Publication Data

US 2012/0281924 A1 Nov. 8, 2012

Related U.S. Application Data

(60) Provisional application No. 61/482,472, filed on May 4, 2011.

(51) Int. Cl.
| | |
|---|---|
| G06K 9/62 | (2006.01) |
| G06K 9/64 | (2006.01) |
| G06K 9/68 | (2006.01) |
| G06K 9/46 | (2006.01) |
| G06K 9/32 | (2006.01) |
| G06K 9/36 | (2006.01) |
| G06T 7/00 | (2006.01) |
| H04N 19/85 | (2014.01) |

(52) U.S. Cl.
CPC .............. *G06T 7/0002* (2013.01); *H04N 19/85* (2013.01); *G06T 2207/20064* (2013.01); *G06T 2207/30168* (2013.01)
USPC ........... 382/209; 382/215; 382/216; 382/218; 382/249; 382/250; 382/277; 382/293

(58) Field of Classification Search
None
See application file for complete search history.

(56) References Cited

U.S. PATENT DOCUMENTS

| | | | |
|---|---|---|---|
| 5,799,112 | A | 8/1998 | De Quiroz et al. |
| 6,005,978 | A | 12/1999 | Garakani et al. |
| 6,594,391 | B1 | 7/2003 | Quadranti et al. |
| 7,228,006 | B2 | 6/2007 | Stubler et al. |
| 7,388,999 | B2 | 6/2008 | Samadani et al. |
| 7,483,486 | B2 | 1/2009 | Mantiuk et al. |
| 7,643,688 | B2 | 1/2010 | Samadani et al. |
| 8,213,735 | B2 | 7/2012 | Cooksey et al. |

(Continued)

OTHER PUBLICATIONS

D.M. Chandler and S.S. Hemami, "VSNR: A wavelet-based visual signal-to-noise ratio for natural images," IEEE Trans. Image Process., vol. 16, No. 9, pp. 2284-2298, Sep. 2007.

(Continued)

*Primary Examiner* — Matthew Bella
*Assistant Examiner* — Jose M Torres
(74) *Attorney, Agent, or Firm* — Victoria Donnelly; IP-MEX Inc.

(57) ABSTRACT

A visual quality assessment method and system are based on deriving a quality metric by comparing sub-band approximations of a distorted image and an undistorted version of the same image, providing a good compromise between computational complexity and accuracy. The sub-band approximations are derived from Discrete Wavelet (Haar) transforms of small image blocks of each image. Due to inherent symmetries, the wavelet transform is "blind" to certain types of distortions. But the accuracy of the method is enhanced, and the blindness of the transform is overcome, by computing quality metrics for the distorted image as well as computing quality metrics for a shifted version of the distorted image and combining the results.

34 Claims, 13 Drawing Sheets

(56) References Cited

U.S. PATENT DOCUMENTS

| | | |
|---|---|---|
| 8,385,971 B2 | 2/2013 | Rhoads et al. |
| 8,515,181 B2 | 8/2013 | Rezazadeh et al. |
| 2002/0009142 A1 | 1/2002 | Aono et al. |
| 2003/0169928 A1 | 9/2003 | Stanek |
| 2004/0146205 A1 | 7/2004 | Becker et al. |
| 2006/0072838 A1 | 4/2006 | Chui et al. |
| 2008/0134070 A1 | 6/2008 | Kobayashi et al. |
| 2009/0097721 A1 | 4/2009 | Kingsbury et al. |
| 2009/0304273 A1 | 12/2009 | Fukuhara |
| 2010/0008574 A1 | 1/2010 | Ishiga |
| 2010/0048242 A1 | 2/2010 | Rhoads et al. |
| 2010/0202700 A1 | 8/2010 | Rezazadeh |
| 2011/0033119 A1 | 2/2011 | Coulombe et al. |
| 2011/0038548 A1 | 2/2011 | Rezazadeh et al. |
| 2011/0212717 A1 | 9/2011 | Rhoads et al. |

OTHER PUBLICATIONS

N. Damera-Venkata, T.D. Kite, W.S. Geisler, B.L. Evans, and A.C. Bovik, "Image quality assessment based on a degradation model," IEEE Trans. Image Process., vol. 9, No. 4, pp. 636-650, Apr. 2000.
M. Miyahara, K. Kotani, and V.R. Algazi, "Objective Picture Quality Scale (PQS) for image coding," IEEE Trans. Commun. vol. 46, No. 9, pp. 1215-1225, Sep. 1998.
N. Ponomarenko, F. Battisti, K. Egiazarian, J. Astola, and V. Lukin, "Metrics performance comparison for color image database," in Proceedings Fourth International Workshop on Video Processing and Quality Metrics for Consumer Electronics, Jan. 2009, Arizona, USA.
Z. Wang and E.P. Simoncelli, "Translation insensitive image similarity in complex wavelet domain," in Proc. IEEE Int. Conf. Acoustics, Speech, Signal Process., vol. 2, Mar. 2005, pp. 573-576.
M.P. Sampat, Z. Wang, S. Gupta, A.G. Bovik, and M.K. Markey, "Complex wavelet structural similarity: A new image similarity index," IEEE Trans. Image Process., vol. 18, No. 11, pp. 2385-2401, Nov. 2009.
H.R. Sheikh, A.C. Bovik and G. de Veciana, "An information fidelity criterion for image quality assessment using natural scene statistics," IEEE Trans. Image Process., vol. 14, No. 12, pp. 2117-2128, Dec. 2005.
S.L.P. Yasakethu, W.A.C. Fernando, S. Adedoyin, and A. Kondoz, "A rate control technique for offline H.264/AVC video coding using subjective quality of video," IEEE Trans. Consum. Electron., vol. 54, No. 3, pp. 1465-1472, Aug. 2008.
M.R. Bolin and G.W. Meyer, "A visual difference metric for realistic image synthesis," in Proc. SPIE Human Vision, Electron. Imag., vol. 3644, San Jose, CA, 1999, pp. 106-120.
Y.-K. Lai and C.-C.J. Kuo, "A Haar wavelet approach to compressed image quality measurent," J. Visual Commun. Imag. Represent., vol. 11, No. 1, pp. 17-40, Mar. 2000.
Z. Wang's SSIM Research Homepage [Online]. Available at: http://www.ece.uwaterloo.ca/~z70wang/research/ssim/2010.
J.L. Mannos and D.J. Sakrison, "The effects of a visual fidelity criterion on the encoding of images," IEEE Trans. Inf. Theory, vol. IT-20, No. 4, pp. 525-536, Jul. 1974.
T. Mitsa and K.L. Varkur, "Evaluation of contrast sensitivity functions for the formulation of quality measures incorporated in halftoning algorithms," in Proc. IEEE Int. Conf. Acoustics, Speech, Signal Processing, vol. 5, Apr. 1993, pp. 301-304.
Intel 64 and IA32 Architectures Optimization Reference Manual, Intel Corporation, Nov. 2009.
Final Report From the Video Quality Experts Group on the Validation of Objective Models of Video Quality Assessment, Phase II VQEG, Aug. 2003 [Online]. Available at http://www.vqeg.org.
Y. Wang, J. Ostermann, and Y-Q. Zhang, Video Processing and Communications. New Jersey: Prentice-Hall, 2002.
Martin Cadik, "Perceptually Based Image Quality Assessment and Image Transformations", Faculty of Electrical Engineering, Czech Technical University in Prague, Jan. 2008, Section 3 "Perceptual Evaluation of Image Quality Metrics". <URL: http://cadik.posvete.ca/diss/cadik08phd.pdf>.
Intel Integrated Performance Primitives. Available at: http://software.intel.com/en-us/intel-ipp/, 2012.
Patrick Le Callet and Florent Autrusseau, "Subjective quality assessment IRCCyN/IVC database," available at: http://www.irccyn.ee-nantes.fr/ivcdb, 2005.
http://sipi.usc.edu/database/database.php?volume=misc, 2012.
S. Rezazadeh and S. Coulombe, "A novel discrete wavelet transform framework for full reference image quality assessment" in Signal, Image and Video Processing, pp. 1-15, Sep. 2011.
Chen, et al., Fast Structural Similarity Index Algorithm:, 2010 IEEE International Conference on Acoustics Speech and Signal Processing (ICASSP) p. 994-991.
Shapiro, "Embedded Image Coding Using Zerotrees of Wavelet Coefficients", IEEE Transactions on Signal Processing, vol. 41, Issue 12, p. 3445-3462, 1993.
S. Rezazadeh and S. Coulombe, "A novel approach for computing and pooling structural similarity index in the discrete wavelet domain," in Proc. IEEE Int. Conf. Image Process., Nov. 2009, pp. 2209-2212.
S. Rezazadeh and S. Coulombe, "Low-Complexity computation of visual information fidelity in the discrete wavelet domain," in Proc. IEEE Int. Conf. Acoustics, Speech, Signal Process., Dallas, TX, Mar. 2010, pp. 2438-2441.
Z. Wang et al., Image Quality Assessment: From Error Visibility to Structural Similarity, IEEE Transactions on Image Processing, vol. 13, No. 4, pp. 600-612, Apr. 2004.
H.R. Sheikh et al., A Statistical Evaluation of Recent Full Reference Image Quality Assessment Algorithms, IEEE Transactions on Image Processing, vol. 15, No. 11, pp. 3441-3452, Nov. 2006.
Z. Wang et al., Multi-Scale Structural Similarity for Image Qualitiy Assessment, 37th IEEE Asilomar Conference on Signals, Systems and Computers, pp. 1398-1402, Nov. 2003.
D.M. Rouse et al., Understanding and Simplifying the Structural Similarity Metric, IEEE International Conference on Image Processing, San Diego, pp. 1188-1191, Oct. 2008.
C.-L. Yang et al., Discrete Wavelet Transform-Based Structural Similarity for Image Quality Assessment, IEEE International Conference on Image Processing, San Diego, pp. 377-380, Oct. 2008.
Z. Wang et al., Spatial Pooling Strategies for Perceptual Image Quality Assessment, IEEE International Conference on Image Processing, Atlanta, pp. 2945-2948, Oct. 2006.
H.R. Sheikh et al., Image Information and Visual Quality, IEEE Transactions on Image Processing, vol. 15, No. 2, pp. 430-444, Feb. 2006.
Z.Wang et al., Modern Image Quality Assessment, Morgan and Claypool, United States, p. 416, 2006.
H.R. Sheikh et al., LIVE Image Quality Assessment Database, Release 2, http://live.ece.utexas.edu/research/quality, 2009.
Z.Wang and A.C.Bovik, "Mean squared error: Love it or leave it? A new look at signal fidelity measures", IEEE Signal Process.Mag., bol.26, No. 1, pp. 98-117, Jan. 2009.
Tampere Image Database 2008 TID2008, Version 1.0, available at: http://www.ponomarenko.info/tid2008.htm.
A.C.Bovik, The Essential Guide to Image Processing. USA: Academic Press, 2009, ch.21.
S.Daly, "The visible difference predictor: An algorithm for the assesment of image fidelity", in Proc. SPIE, vol. 1616, Feb. 1992, pp. 2-15.
P.C.Teo and D.J.Heeger, Perceptual Image distortion, in Proc. IEEE. Int. Conf. Image Process., vol. 2, Nov. 1994, pp. 982-986.
Lubin, "A visual discrimination mode for the imaging system design and evaluation" in Visual Models for Target Detection and Recognition, Singapore: World Scientific, 1995, pp. 245-283.
Book: Vision Models for Target Detection and Recognition, edited by E Peli, May 1995, published by World Scientific Publishing Co.

```
900

% Draw DCT basis
% Stephane Coulombe, ETS, 2011-05-01
clc
B=4;            % Block size for 4x4 DCT basis
fill = 128;     % Fill
stride=B+2;     % distance between beginning of each blocks when drawing
Basis=ones(stride*B,stride*B); % DCT basis % 4x4 DCT definition
a= 1/2;
b=sqrt(1/2)*cos(pi/8);
c=sqrt(1/2)*cos(3*pi/8);
A = [a a a a ; b c -c -b; a -a -a a; c -b b -c];

% boolean array containing coefficients having symmetry on 2x2 blocks
sym=zeros(B,B);
sym2=zeros(B,B);

% Compute 4x4 DCT basis
for m=1:B
    for n=1:B
        F = zeros(B,B);  % Set all DCT coefficients to zero
        F(m,n)= fill;    % Set one DCT coefficient to non zero
        I = A'*F*A;      % Compute spatial representation % Check if the basis has the same average for each 2x2 subblock
        S = [1 1 0 0; 0 0 1 1] * I * [1 0; 1 0; 0 1; 0 1]
        if (S(1,1)==0 && S(1,2)==0 && S(2,1)==0 && S(2,2)==0)
            sym(m,n)=1;% Set sym to 1 if all 2x2 sub-block has same DC
        end posx = stride*(m-1)+(stride-B)/2;
        posy = stride*(n-1)+(stride-B)/2;
        Basis(posx+1:posx+B,posy+1:posy+B) = I(1:B,1:B)+ 128;
    end
end
sym
imshow(Basis, [min(min(Basis)) max(max(Basis))]);
```

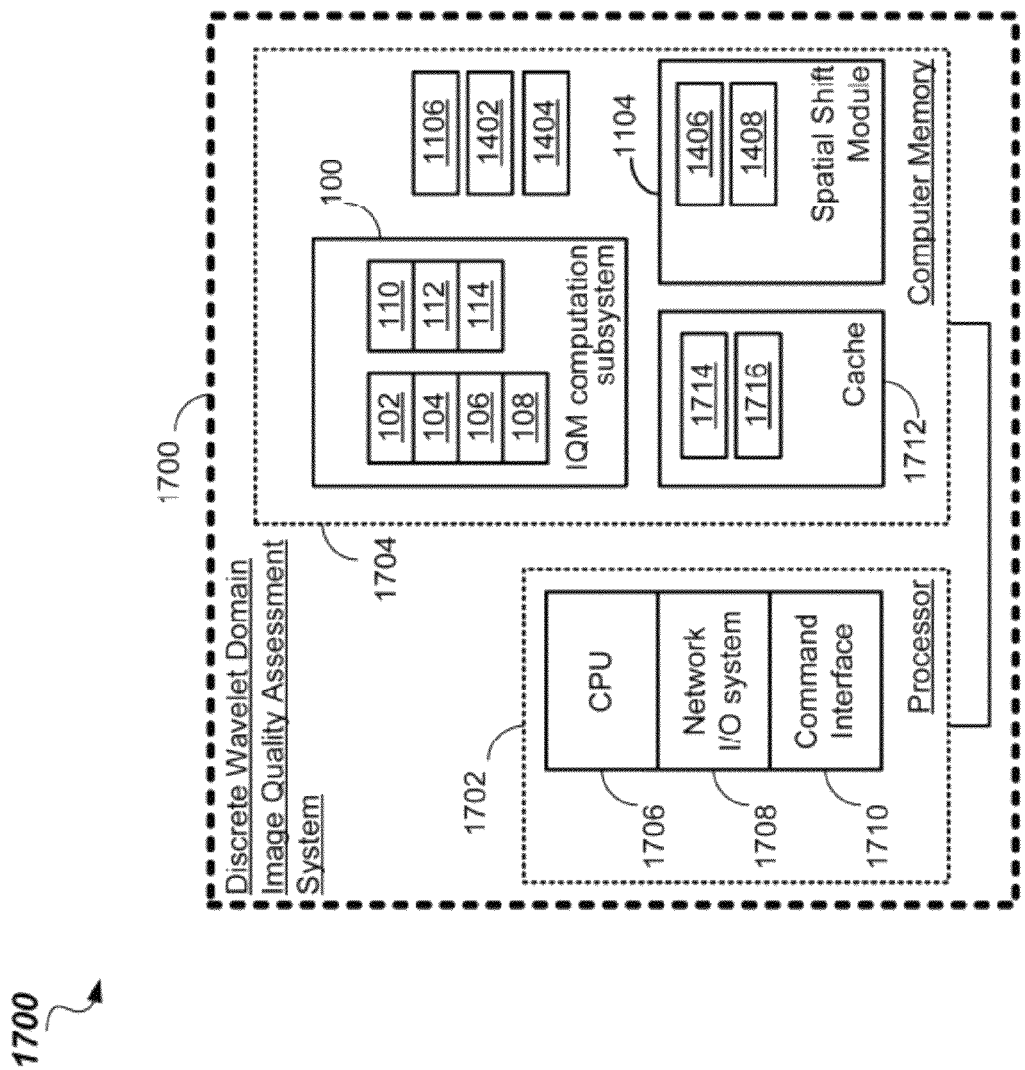

METHOD AND SYSTEM FOR INCREASING ROBUSTNESS OF VISUAL QUALITY METRICS USING SPATIAL SHIFTING

RELATED APPLICATIONS

The present application claims benefit from the U.S. provisional application Ser. No. 61/482,472 filed on May 4, 2011, entire contents of which are incorporated herein by reference.

FIELD OF THE INVENTION

The present invention relates to the assessment of image quality, and in particular, to a method and system for determining an improved measure of quality or metric for images with enhanced perceptual performance.

BACKGROUND OF THE INVENTION

Image quality assessment plays an important role in the development and validation of various image and video applications, such as compression and enhancement. Objective quality models are usually classified based on the availability of reference images. If an undistorted reference image is available, the quality metric is considered as a full reference (FR) assessment method. Several image and video applications require that the quality be assessed in real-time. Consequently, the computational complexity associated with a quality assessment method becomes an important issue to address. Another important factor to consider is the accuracy of the quality assessment method, which indicates how well computed quality scores correspond with the opinions of human beings.

Accordingly, a method and system to improve the accuracy of a quality assessment method of low complexity is required.

SUMMARY OF THE INVENTION

There is an object of the present invention to provide a method and system for increasing robustness of visual quality metrics using spatial shifting.

According to one aspect of the invention, there is provided a method of computing a measure of quality for a distorted image Y, the measure characterizing a similarity between the image Y and an undistorted reference image X having the same number of rows and columns of pixels as the image Y, the method comprising employing at least one processor for:
 (a) transforming the distorted image Y and the undistorted reference image X by a transformation process to generate a transform of the distorted image Y and a transform of the undistorted reference image X respectively, the transformation process having a blindness property of not containing all information regarding an image to be transformed in a transform of the image, thus resulting in certain patterns of the image not to be recognized during the transformation process;
 (b) spatially shifting pixels in the reference image X and the distorted image Y by a spatial shift, having the same predefined amount of pixels, to generate a spatially shifted version X2 of the reference image X and a spatially shifted version Y2 of the image Y respectively, the spatial shift being chosen so that the certain patterns become detectable during the transformation process applied to the spatially shifted versions X2 and Y2;
 (c) transforming the spatially shifted version Y2 and the spatially shifted version X2 by the transformation process to generate a transform of the spatially shifted version Y2 and a transform of the spatially shifted version X2 respectively; and
 (d) determining the measure of quality for the distorted image Y as a function of the transform of the distorted image Y, the transform of the undistorted reference image X; the transform of the spatially shifted version Y2, and the transform of the spatially shifted version X2.

The step (b) further comprises:
 dividing the pixels of the reference image X into blocks of W by W pixels, W being a smaller number than the number of rows and columns of pixels; and
 dividing the pixels of the distorted image Y into corresponding blocks of W by W pixels.

The step (b) further comprises:
 spatially shifting horizontally by a first predefined amount; or
 spatially shifting vertically by a second predefined amount; or
 spatially shifting horizontally and vertically by first and second predefined amounts respectively.

Conveniently, the first predefined amount and the second predefined amount may be chosen to be the same.

In an embodiment of the invention, W is equal to $2^N$, wherein an exponent N is a decomposition level of the transformation process.

For example, each of the first and second predefined amounts may be chosen as the larger of 1 and $(W/2-1)$.

In an embodiment of the invention, the first and second predefined amounts are odd numbers less than W.

In the method described above, the transformation process is one of the following: a cosine transform; a sine transform; or a wavelet transform.

In the embodiment of the invention, the transformation process is a Haar transform. Alternatively, the transformation process can be a Daubechies transform.

In the method described above, the step (d) further comprises:
 computing a first approximation image quality metric IQMA using the transform of the distorted image Y and the transform of the undistorted reference image X;
 computing a second approximation image quality metric IQM'A using the transform of the spatially shifted version Y2 and the transform of the spatially shifted version X2; and
 processing the first and second approximation image quality metrics IQMA and IQM'A to generate the measure of quality for the distorted image Y.

In the embodiment of the invention, the first and second approximation quality metrics IQMA and IQM'A respectively are first and second approximation quality maps, and the step (d) further comprises:
 creating first and second contrast maps of the reference image X and of the spatially shifted version X2 respectively;
 performing weighted pooling of the first and second approximation quality maps using the first and second contrast maps respectively to produce an approximation quality score SA; and
 determining the measure of quality using the approximation quality score SA.

The step (d) further comprises:
 (i) computing a first edge image quality metric IQME using the transform of the distorted image Y and the transform of the undistorted reference image X;

(ii) computing a second edge image quality metric IQM'E using the transform of the spatially shifted version Y2 and the transform of the spatially shifted version X2; and (iii) determining the measure of quality for the distorted image Y as the function of IQMA, IQM'A, IQME and IQM'E.

The step (iii) further comprises:

processing the first and second approximation image quality metrics IQMA and IQM'A to generate an approximation quality score SA;

processing the first and second edge quality metrics IQME and IQM'E to generate an edge quality score SE; and determining the measure of quality for the distorted image Y as a function of the approximation quality score SA and the edge quality score SE.

In the embodiment of the invention, the measure of quality is computed as a final score SF=a*SA+(1−a)*SE, with SF value ranging from 0 to 1.

In the method described above, the first and second approximation quality metrics IQMA and IQM'A respectively are first and second approximation quality maps, and the first and second edge quality metrics IQME and IQM'E respectively are first and second edge quality maps, and the step (d) further comprises:

(d1) creating first and second contrast maps of the reference image X and of the spatially shifted version X2 respectively;

(d2) performing weighted pooling of the first and second approximation quality maps using the first and second contrast maps respectively to produce an approximation quality score SA;

(d3) performing weighted pooling of the first and second edge quality maps using the first and second contrast maps respectively to produce an edge quality score SE; and (d4) processing the approximation quality score SA and the edge quality score SE to determine the measure of quality.

The step of creating first and second contrast maps further comprises assigning values to pixels of the first and second approximation quality maps, and the first and second edge maps of the reference image X and the spatially shifted version X2 according to their respective importance to a human visual system.

The step (d2) further comprises one of averaging the first approximation quality map and the second approximation quality map, and of taking the minimum of the first approximation quality map and the second approximation quality map to produce the approximation quality score SA.

According to another aspect of the invention, there is provided a system for computing a measure of quality for a distorted image Y, the measure characterizing a similarity between the image Y and an undistorted reference image X having the same number of rows and columns of pixels as the image Y, the system comprising:

a processor;

a non-transitory computer readable storage medium having computer readable instructions stored thereon for execution by the processor, causing the processor to:

(a) transform the distorted image Y and the undistorted reference image X by a transformation process to generate a transform of the distorted image Y and a transform of the undistorted reference image X respectively, the transformation process having a blindness property of not containing all information regarding an image to be transformed in a transform of the image, thus resulting in certain patterns of the image not to be recognized during the transformation process;

(b) spatially shift pixels in the reference image X and the distorted image Y by a spatial shift, having the same predefined amount of pixels, to generate a spatially shifted version X2 of the reference image X and a spatially shifted version Y2 of the image Y respectively, the spatial shift being chosen so that the certain patterns become detectable during the transformation process applied to the spatially shifted versions X2 and Y2;

(c) transform the spatially shifted version Y2 and the spatially shifted version X2 by the transformation process to generate a transform of the spatially shifted version Y2 and a transform of the spatially shifted version X2 respectively; and (d) determine the measure of quality for the distorted image Y as a function of the transform of the distorted image Y, the transform of the undistorted reference image X, the transform of the spatially shifted version Y2, and the transform of the spatially shifted version X2.

In the system described above, the computer readable instructions further cause the processor to:

divide the pixels of the reference image X into blocks of W by W pixels, W being a smaller number than the number of rows and columns of pixels; and divide the pixels of the distorted image Y into corresponding blocks of W by W pixels.

The computer readable instructions further cause the processor to:

spatially shift horizontally by a first predefined amount; or spatially shift vertically by a second predefined amount; or spatially shift horizontally and vertically by first and second predefined amounts respectively.

In the system described above, the first predefined amount and the second predefined amount are the same.

For example, W may be equal to $2^N$, wherein an exponent N is a decomposition level of the transformation process; and each of the first and second predefined amounts may be chosen as the larger of 1 and (W/2−1). Alternatively, the first and second predefined amounts may be chosen as odd numbers less than W.

In the system described above, the transformation process is one of the following: a cosine transform; a sine transform; or a wavelet transform.

In the embodiments of the invention, the transformation process is a Haar transform. Alternatively, the transformation process may be a Daubechies transform.

In the system described above, the computer readable instructions further cause the processor to:

compute a first approximation image quality metric IQMA using the transform of the distorted image Y and the transform of the undistorted reference image X;

compute a second approximation image quality metric IQM'A using the transform of the spatially shifted version Y2 and the transform of the spatially shifted version X2; and process the first and second approximation image quality metrics IQMA and IQM'A to generate the measure of quality for the distorted image Y.

The first and second approximation quality metrics IQMA and IQM'A respectively are first and second approximation quality maps, and the computer readable instructions further cause the processor to:

create first and second contrast maps of the reference image X and of the spatially shifted version X2 respectively;

perform weighted pooling of the first and second approximation quality maps using the first and second contrast maps respectively to produce an approximation quality score SA; and determine the measure of quality using the approximation quality score SA.

In the system described above, the computer readable instructions further cause the processor to:
(i) compute a first edge image quality metric IQME using the transform of the distorted image Y and the transform of the undistorted reference image X;
(ii) compute a second edge image quality metric IQM'E using the transform of the spatially shifted version Y2 and the transform of the spatially shifted version X2; and
(iii) determine the measure of quality for the distorted image Y as the function of IQMA, IQM'A, IQME and IQM'E.

The computer readable instructions further cause the processor to:
process the first and second approximation image quality metrics IQMA and IQM'A to generate an approximation quality score SA;
process the first and second edge quality metrics IQME and IQM'E to generate an edge quality score SE; and
determine the measure of quality for the distorted image Y as a function of the approximation quality score SA and the edge quality score SE.

In the system described above, the measure of quality is computed as a final score SF=a*SA+(1−a)*SE, with SF value ranging from 0 to 1.

In the embodiments of the invention, the first and second approximation quality metrics IQMA and IQM'A respectively are first and second approximation quality maps, the first and second edge quality metrics IQME and IQM'E respectively are first and second edge quality maps, and the computer readable instructions further cause the processor to:
create first and second contrast maps of the reference image X and of the spatially shifted version X2 respectively;
perform weighted pooling of the first and second approximation quality maps using the first and second contrast maps respectively to produce an approximation quality score SA;
perform weighted pooling of the first and second edge quality maps using the first and second contrast maps respectively to produce an edge quality score SE; and
process the approximation quality score SA and the edge quality score SE to determine the measure of quality.

The computer readable instructions further cause the processor to assign values to pixels of the first and second approximation quality maps, and the first and second edge maps of the reference image X and the spatially shifted version X2 according to their respective importance to a human visual system.

The computer readable instructions further cause the processor to perform one of averaging the first approximation quality map and the second approximation quality map, and of taking the minimum of the first approximation quality map and the second approximation quality map to produce the approximation quality score SA.

According to yet another aspect of the invention, there is provided a system for computing a measure of quality for a distorted image Y, the measure characterizing a similarity between the image Y and an undistorted reference image X, the system comprising:

a processor;
a memory having computer readable instructions stored thereon for execution by the processor, causing the processor to process the distorted image Y and an undistorted reference image X, comprising:
a Transform module transforming the distorted image Y and the undistorted reference image X by a transformation process to generate a transform of the distorted image Y and a transform of the undistorted reference image X respectively, the transformation process having a blindness property of not containing all information regarding an image to be transformed in a transform of the image, thus resulting in certain patterns of the image not to be recognized during the transformation process;
a Spatial Shift module for generating spatially shifted versions Y2 and X2 of the distorted image Y and the reference image X respectively;
the Transform module being further configured to transform the spatially shifted version Y2 and the spatially shifted version X2 by the transformation process to generate a transform of the spatially shifted version Y2 and a transform of the spatially shifted version X2 respectively
an Image Quality Metric (IQM) computation subsystem for determining the measure of quality for the distorted image Y as a function of the transform of the distorted image Y, the transform of the undistorted reference image X, the transform of the spatially shifted version Y2, and the transform of the spatially shifted version X2.

The IQM computation subsystem further comprises an Approximation Quality Map/Score Computation Module for:
computing a first approximation image quality metric IQMA using the transform of the distorted image Y and the transform of the undistorted reference image X; and
computing a second approximation image quality metric IQM'A using the transform of the spatially shifted version Y2 and the transform of the spatially shifted version X2.

The system further comprises a Final Score Computation module for combining the first and second approximation image quality metrics IQMA and IQM'A to generate the measure of quality for the distorted image Y.

The system further comprises an Edge Quality Map/Score Computation Module for:
computing a first edge image quality metric IQME using the transform of the distorted image Y and the transform of the undistorted reference image X; and
computing a second edge image quality metric IQM'E using the transform of the spatially shifted version Y2 and the transform of the spatially shifted version X2;
the Final Score Computation module being further configured to determine the measure of quality for the distorted image Y as the function of IQMA, IQMA'A, IQME and IQM'E.

The system further comprises:
a Common Pooling of Approximation Quality Map Module for combining the first and second approximation image quality metrics IQMA and IQM'A to generate an approximation quality score SA;
a Common Pooling of Edge Map Module for combining the first and second edge quality metrics IQME and IQM'E to generate an edge quality score SE; and
the Final Score Computation module being further configured to determine the measure of quality for the distorted image Y as a function of the approximation quality score SA and the edge quality score SE.

In the system described above, the function of the approximation quality score SA and the edge quality score SE is computed as a final score SF=a*SA+(1−a)*SE, with SF value ranging from 0 to 1.

In the embodiments of the invention, the first and second approximation quality metrics IQMA and IQM'A respectively are first and second approximation quality maps, and the system further comprises:
- a Contrast Map Generation Module for creating first and second contrast maps of the reference image X and of the spatially shifted version X2 respectively, and
- the Common Pooling of Approximation Quality Map Module being further configured to perform weighted pooling of the first and second approximation quality maps using the first and second contrast maps respectively to produce the approximation quality score SA.

In the system described above, the first and second approximation quality metrics IQMA and IQM'A respectively are first and second approximation quality maps, the first and second edge quality metrics IQME and IQM'E respectively are first and second edge quality maps, the system further comprising:
- a Contrast Map Generation Module for creating first and second contrast maps of the reference image X and of the spatially shifted version X2 respectively;
- the Common Pooling of Approximation Quality Map Module being further configured to perform weighted pooling of the first and second approximation quality maps using the first and second contrast maps respectively to produce the approximation quality score SA, and to perform weighted pooling of the first and second edge quality maps using the first and second contrast maps respectively to produce the edge quality score SE.

The Contrast Map Generation Module is further configured to create first and second contrast maps, including assigning corresponding values to pixels of the first and second approximation quality maps, and the first and second edge maps of the reference image X and the spatially shifted version X2 according to their respective importance to a human visual system.

The Final Score Computation module is further configured to perform one of:
- averaging the approximation quality score SA and the edge quality score SE; and
- taking the minimum of the approximation quality score SA and the edge quality score SE to determine the measure of quality.

The Transform Module is further configured to:
- divide the pixels of the reference image X into blocks of W by W pixels, W being a smaller number than the number of rows and columns of pixels; and
- divide the pixels of the distorted image Y into corresponding blocks of W by W pixels.

The Spatial Shift module is further configured to:
- spatially shift horizontally by a first predefined amount; or
- spatially shift vertically by a second predefined amount; or
- spatially shift horizontally and vertically by first and second predefined amounts respectively.

Thus, an improved method and systems for increasing robustness of visual quality metrics using spatial shifting have been provided.

BRIEF DESCRIPTION OF THE DRAWINGS

Embodiments of the invention will now be described, by way of example, with reference to the accompanying drawings in which:

FIG. 4 shows a Matlab code fragment 900 for generating and displaying the 4×4DCT basis used in H.264compression;

FIG. 5 shows a number array 1000 illustrating results of the 4×4DCT basis from FIG. 4, calculated at an arbitrary scale;

FIG. 12 shows an exemplary hardware view 1700 of the discrete wavelet domain image quality assessment system 1400 including a Processor 1702 and a Computer Memory 1704 according to the embodiments of the invention.

DETAILED DESCRIPTION OF THE EMBODIMENTS OF THE INVENTION

Figure 1:
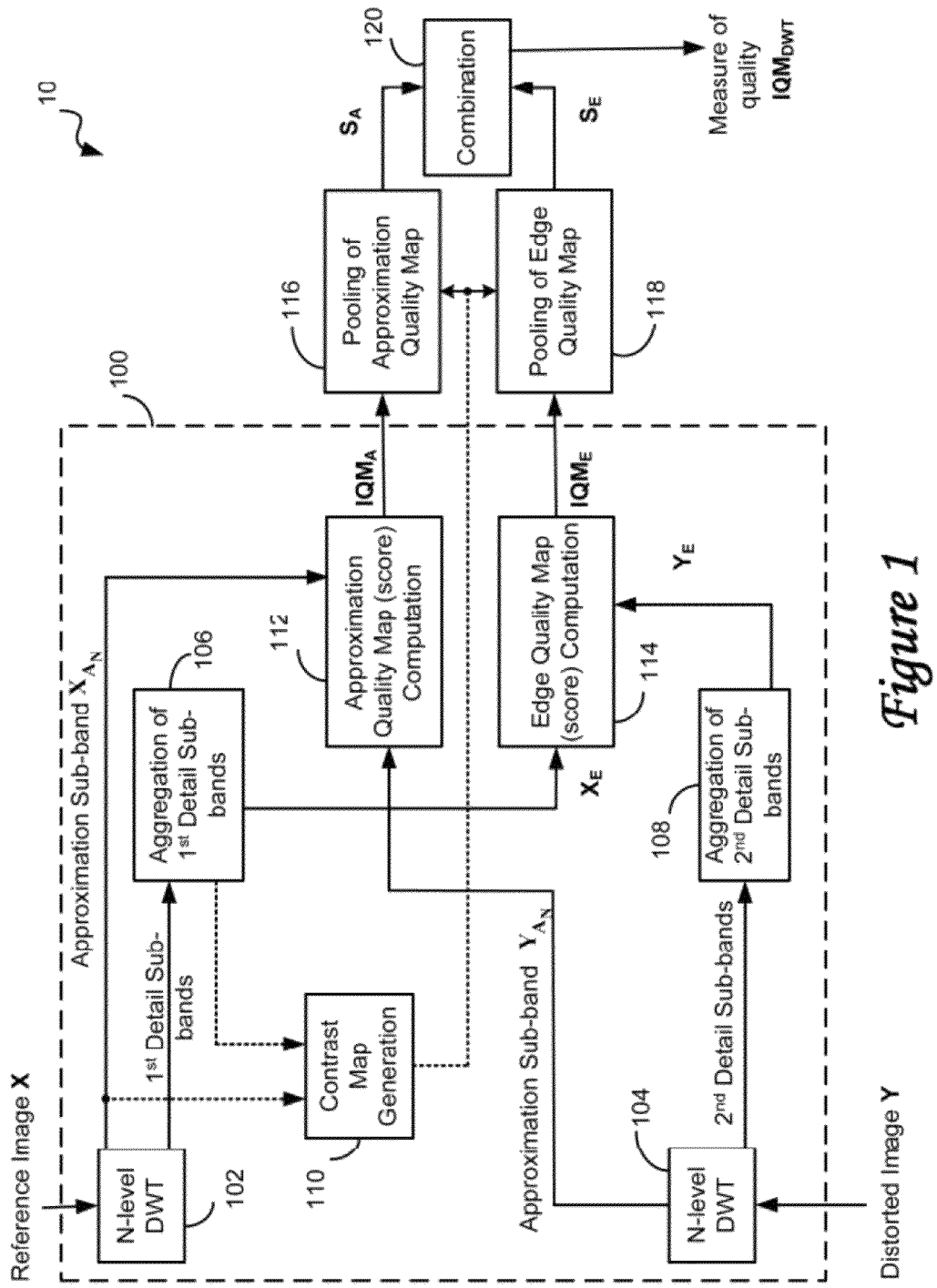
FIG. 1 shows a block diagram of a discrete wavelet domain image quality assessment framework 10 for determining a measure of quality.

Embodiments of the present invention provide a quality assessment method which aims to achieve a good compromise between good accuracy and low complexity.

Glossary

| | |
|---|---|
| Approximation-map (or approximation quality map): | characterizes the main content of an image and is determined as the approximation sub-band of the image obtained after one-level (or higher level) discrete wavelet decomposition. |
| Approximation sub-band: | sub-band containing main content of an image, i.e. the low frequency content. |
| Approximation quality score: | measure of similarity of the approximation sub-band of image X and the approximation sub-band of image Y. |
| Approximation quality measure: | measure of image quality that provides an approximation quality score when a map-based metric is used for quality assessment (e.g., VIF) or an approximation quality map (also called approximation-map) when a non map-based metric is used for quality assessment (e.g., $SSIM_{W\&B}$). |
| Contrast map: | weighting function for automatically assigning weights to pixels in different regions of an image based on their visual importance. |
| Correlation coefficient: | a statistical measure computed between two image patches based on Pearson product-moment correlation coefficient. |
| DC: | (Direct Current) indicates the zero-frequency component of a transform, i.e. the average value. |
| Detail sub-bands: | sub-bands containing fine edges of an image. |
| Diagonal detail sub-band: | sub-band containing fine diagonal edges of an image. |
| Discrete wavelet transform (DWT) | transform applied to an image to separate its low frequency components from its high frequency components. |
| Discrete Cosine Transform (DCT) | discrete cosine transform used for multiresolution decomposition of images. |
| Edge-map (or edge quality map): | characterizes the fine edges of an image and is determined as the square root of the mean square of horizontal, vertical, and diagonal detail sub-bands of the image obtained after one-level (or higher level) discrete wavelet decomposition. |
| Edge quality score: | measure of similarity between the detail sub-bands of two images. |
| Edge quality measure: | measure of image quality that provides an edge quality score when a map-based metric is used for quality assessment (e.g., VIF) or an edge quality map (also called edge-map) when a non map-based metric is used for quality assessment (e.g., $SSIM_{W\&B}$). |
| Gaussian sliding window: | a set of N coefficients with unit sum and Gaussian probability distribution. |
| Horizontal sub-band: | sub-band containing fine horizontal edges of an image. |
| Multiresolution decomposition: | a transform applied on digital images for generating sub-bands, one of which contains the low frequency main content of original image and other sub-bands contain fine edges of the original image. |
| $S_A$ and $S_E$: | approximation and edge quality scores respectively. |
| $S_f$: | Final score. |
| Structural SIMilarity (SSIM): | an accurate measure of image quality that captures similarity between two images and can be computed with high, but still acceptable, computational complexity compared to other image quality metrics such as VIF. |
| $SSIM_{W\&B}$: | SSIM method of quality assessment proposed by Z. Wang and A. C. Bovik. |
| Quality score: | an intermediary similarity value, which is used for calculating the final score. There are two kinds of quality scores: approximation quality score and edge quality score. |
| Quality map: | an intermediary similarity value, which is used for calculating the quality measure in map-based visual quality assessment methods (e.g., when $SSIM_{W\&B}$ is used for quality assessment). There are two kinds of quality maps: approximation quality maps (or approximation-maps) and edge quality maps (or edge-maps). |
| Visual Information Fidelity (VIF): | a method of quality assessment for images proposed by H. R. Sheikh and A. C. Bovik. |
| Vertical sub-band: | sub-band containing fine vertical edges of an image. |

The peak signal-to-noise ratio (PSNR) is among the oldest and the most widely used FR image quality evaluation measure, because it is simple, has clear physical meaning, is parameter-free, and performs superbly in an optimization context. However, conventional PSNR cannot adequately reflect the human perception of image fidelity, that is, a large PSNR gain may correspond to only a small improvement in visual quality. This has led researchers to develop a number of other quality measures. Tables I and II show the accuracy of PSNR against other quality metrics, see H. R. Sheikh, Z.

Wang, L. Cormack, and A. C. Bovik, "LIVE Image Quality Assessment Database Release 2," available at: http://live.ece.utexas.edu/research/quality. This release of the LIVE Image Quality Assessment Database consists of 779 distorted images derived from 29 original colour images using five types of distortion: JPEG compression, JPEG2000 compression, Gaussian white noise (GWN), Gaussian blurring (GBlur), and the Rayleigh fast fading (FF) channel model. The realigned subjective quality data for the database are used in all experiments, see H. R. Sheikh, Z. Wang, L. Cormack, and A. C. Bovik, "LIVE Image Quality Assessment Database Release 2". The metric used in Table I is the Pearson correlation coefficient (LCC) between the Difference Mean Opinion Score (DMOS) and the objective model outputs after nonlinear regression. The correlation coefficient gives an evaluation of prediction accuracy. We use the five-parameter logistical function defined in H. R. Sheikh, M. F. Sabir, and A. C. Bovik, "A statistical evaluation of recent full reference image quality assessment algorithms," *IEEE Trans. Image Process.*, vol. 15, no. 11, pp. 3440-3451, November 2006 for nonlinear regression. The metric used in Table II is the Spearman rank correlation coefficient (SRCC), which provides a measure of prediction monotonicity.

It can be seen that PSNR (denoted $PSNR_{spatial}$ in the tables) has a significantly lower correlation coefficient (LCC) and Spearman Rank Order (SRCC) compared to other visual quality metrics such as Structural SIMilarity (SSIM) spatial and autoscale as well as Visual Information Fidelity (VIF). Unfortunately, these more accurate metrics are obtained at the cost of very high computational complexity.

TABLE I

LCC VALUES AFTER NONLINEAR REGRESSION
FOR THE LIVE IMAGE DATABASE

| Model | JPEG | JPEG2000 | GWN | GBlur | FF | All Data |
|---|---|---|---|---|---|---|
| $SSIM_{spatial}$ | 0.9504 | 0.9413 | 0.9747 | 0.8743 | 0.9449 | 0.9038 |
| $SSIM_{autoscale}$ | 0.9778 | 0.9669 | 0.9808 | 0.9483 | 0.9545 | 0.9446 |
| mean $SSIM_A$ | 0.9762 | 0.9699 | 0.9645 | 0.9548 | 0.9625 | 0.9412 |
| $S_A$ | 0.9782 | 0.9705 | 0.9724 | 0.9724 | 0.9730 | 0.9534 |
| $SSIM_{DWT}$ | 0.9835 | 0.9747 | 0.9791 | 0.9690 | 0.9735 | 0.9556 |
| $PSNR_{spatial}$ | 0.8879 | 0.8996 | 0.9852 | 0.7835 | 0.8895 | 0.8701 |
| wSNR | 0.9692 | 0.9351 | 0.9776 | 0.9343 | 0.8983 | 0.9211 |
| $PSNR_A$ | 0.9793 | 0.9542 | 0.9806 | 0.9241 | 0.8868 | 0.9288 |
| $PSNR_{DWT}$ | 0.9787 | 0.9549 | 0.9838 | 0.9234 | 0.8994 | 0.9300 |
| $AD_A$ | 0.9817 | 0.9587 | 0.9637 | 0.9307 | 0.9005 | 0.9350 |
| $AD_{DWT}$ | 0.9807 | 0.9579 | 0.9678 | 0.9258 | 0.9064 | 0.9344 |
| VIF | 0.9864 | 0.9773 | 0.9901 | 0.9742 | 0.9677 | 0.9593 |
| $DWT\text{-}VIF_A$ | 0.9856 | 0.9735 | 0.9904 | 0.9615 | 0.9611 | 0.9639 |
| DWT-VIF | 0.9852 | 0.9740 | 0.9906 | 0.9652 | 0.9650 | 0.9654 |

TABLE II

SRCC VALUES AFTER NONLINEAR REGRESSION
FOR THE LIVE IMAGE DATABASE

| Model | JPEG | JPEG2000 | GWN | GBlur | FF | All Data |
|---|---|---|---|---|---|---|
| $SSIM_{spatial}$ | 0.9449 | 0.9355 | 0.9629 | 0.8944 | 0.9413 | 0.9104 |
| $SSIM_{autoscale}$ | 0.9764 | 0.9614 | 0.9694 | 0.9517 | 0.9556 | 0.9479 |
| mean $SSIM_A$ | 0.9738 | 0.9634 | 0.9490 | 0.9620 | 0.9622 | 0.9441 |
| $S_A$ | 0.9779 | 0.9634 | 0.9577 | 0.9703 | 0.9699 | 0.9573 |
| $SSIM_{DWT}$ | 0.9819 | 0.9678 | 0.9683 | 0.9707 | 0.9708 | 0.9603 |
| $PSNR_{spatial}$ | 0.8809 | 0.8954 | 0.9854 | 0.7823 | 0.8907 | 0.8756 |
| wSNR | 0.9610 | 0.9292 | 0.9749 | 0.9330 | 0.8990 | 0.9240 |
| $PSNR_A$ | 0.9647 | 0.9499 | 0.9777 | 0.9219 | 0.8853 | 0.9307 |
| $PSNR_{DWT}$ | 0.9648 | 0.9494 | 0.9818 | 0.9230 | 0.9004 | 0.9325 |
| $AD_A$ | 0.9666 | 0.9553 | 0.9805 | 0.9335 | 0.9067 | 0.9421 |
| $AD_{DWT}$ | 0.9661 | 0.9546 | 0.9835 | 0.9290 | 0.9131 | 0.9412 |
| VIF | 0.9845 | 0.9696 | 0.9858 | 0.9726 | 0.9649 | 0.9635 |
| $DWT\text{-}VIF_A$ | 0.9837 | 0.9669 | 0.9848 | 0.9618 | 0.9597 | 0.9663 |
| DWT-VIF | 0.9829 | 0.9680 | 0.9853 | 0.9657 | 0.9641 | 0.9681 |

In the previous patent applications Ser. Nos. 12/906,111 and 12/906,112 filed on Oct. 17, 2010 of the same inventors, a framework using the Haar transform is disclosed which provides a good compromise between computational complexity and accuracy. For instance $PSNR_A$, $S_A$, $DWT\_VIF_A$ are examples of such metrics developed using the framework. As shown in Tables I and II, $PSNR_A$ has much higher accuracy than PSNR. Still, $PSNR_A$ has a computational complexity comparable to PSNR. The "A" subscript in the above metrics indicate that only approximation sub-bands are used to assess the quality. To reduce computations, the 2×2 Haar transform has been used as a transformation process. With the 2×2 Haar transform, the approximation sub-band is obtained by computing the average of the pixel intensity within each W×W block (where the block dimension W=2^N with "N" being the decomposition level). Metrics developed from the averages of each W×W block in the reference and the distorted images, are then used in computing a quality score. Computing the quality is thus a block-based process. Typical choices for the decomposition level N are, for a 256×256 image, N=1, and for a 512×512 image, N=2.

However, it can be observed that this averaging process creates a "blindness" in these metrics due to the fact that any distortion (however bad it might be) in an image that does not affect the average over each W×W block remains hidden. As a result, the distortion becomes undetectable. In other words, when considering the approximation band, if the original and the distorted images have the same pixel intensity average for each W×W block, then no distortion will be detected although there could be severe image degradation. Note that in this document, we use the 2×2 Haar transform, but other sizes of the Haar transform could be used (e.g. 3×3, 4×4, etc.), also creating "blindness" problems. When the context is clear, we will use Haar transform to refer to the 2×2 Haar transform. A person skilled in the art of digital signal processing will know how to adapt the invention presented herein to other Haar transform sizes.

However, as tested over large image and video databases such as the LIVE image database used to generate Table I and II, for most common distortions such as inherent in JPEG and JPEG 2000 encoding, Gaussian blur, fast fading and H.264compression, this does not typically become a problem and the metrics perform very well. This is due to the fact that, usually, if an image is distorted, the average will be affected as well as the high frequencies in a W×W block.

Unfortunately, the proposed metrics, using the 2×2 Haar transform, are blind to certain types of distortions. For instance, consider the operation of modifying (e.g. quantizing or suppressing) the frequency coefficients of a 4×4DCT transformed block, which is a common operation in H.264video compression. For a decomposition level of N=2, leading to a Haar transform operating on 4×4blocks, altering any of these frequency coefficients, except the DC, will not have any impact on the measured quality since only the DC of the 4×4block is considered in the metric computation. This observation is a consequence of the definition of 4×4DCT, namely that none of the frequency coefficients except for the DC have any impact on the average.

Furthermore, using again a 4×4DCT transformed block, we can observe that, due to symmetry of the 4×4DCT, altering certain frequency coefficients in the block will not have any influence on the DC of the 2×2 Haar transform. Consequently, a metric based on a Haar transform with a decomposition level of 1 would be blind to changes of these other frequency coefficients or distortions.

A complete description of a DWT-based framework for computing a general purpose full reference (FR) image quality metric (IQM) may also be found in the appendix.

FIG. 1 shows a block diagtam of a discrete wavelet domain image quality assessment framework 10 for determining a measure of quality $IQM_{DWT}$. The discrete wavelet domain image quality assessment framework 10 includes:
an IQM computation subsystem 100 comprising:
first and second N-level DWT modules 102 and 104 respectively,
first and second Detail Sub-band Aggregation Modules 106 and 108,
a Contrast Map Generation Module 110,
an Approximation Quality Map/Score Computation Module 112, and
an Edge Quality Map/Score Computation Module 114; as well as
a Pooling of Approximation Quality Map Module 116;
a Pooling of Edge Map Module 118; and
a Combination Module 120.

Figure 1A:
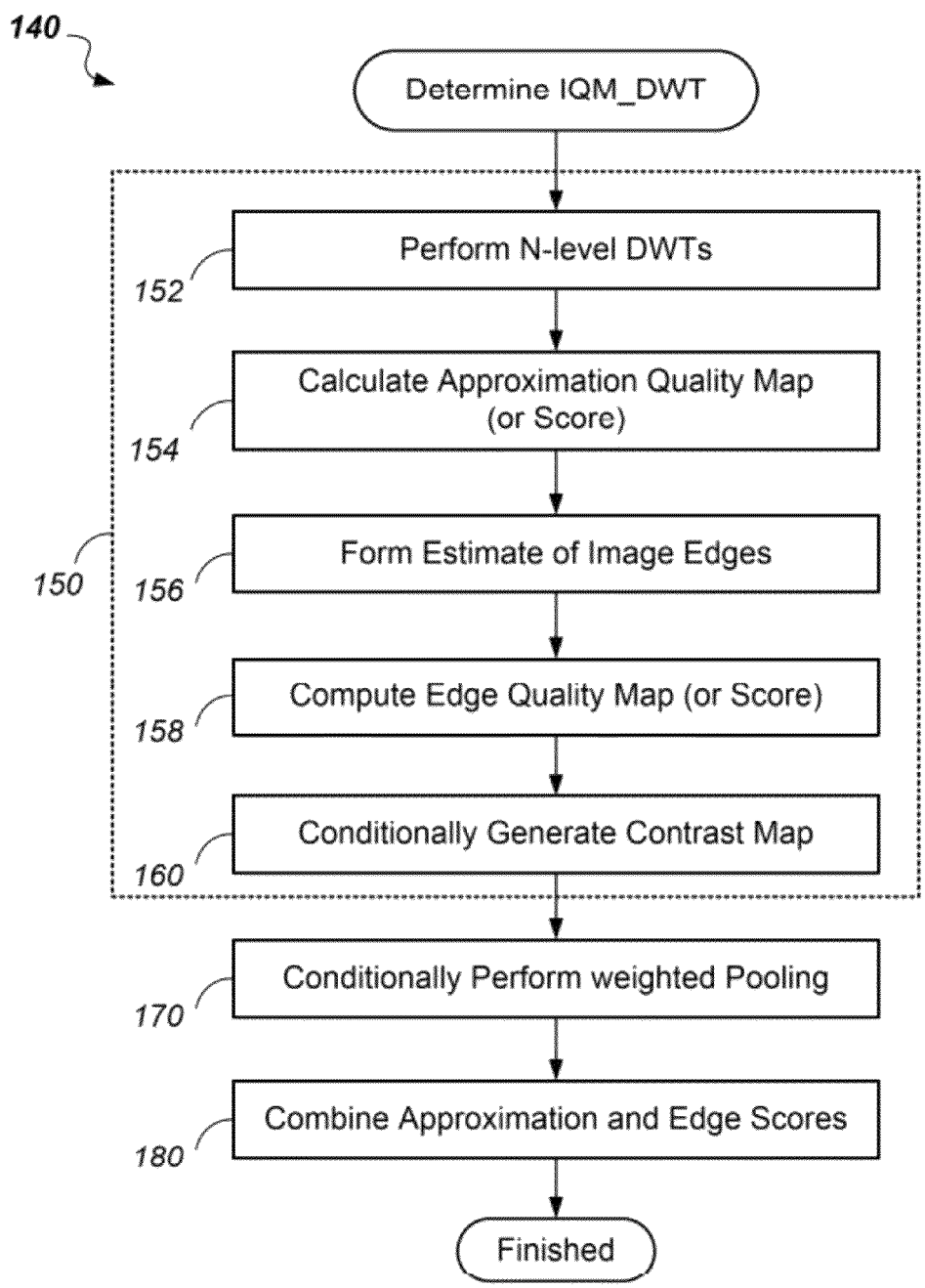
FIG. 1A shows a flowchart of a corresponding method 140 for determining the measure of quality.

FIG. 1A shows a flowchart of a corresponding method 140 for determining the measure of quality $IQM_{DWT}$, including steps:
150 "Compute IQMs" which is a grouping of five steps:
152 "Perform N-level DWTs";
154 "Calculate Approximation Quality Map (or Score)";
156 "Form Estimate of Image Edges";
158 "Compute Edge Quality Map (or Score)"; and
160 "Conditionally Generate Contrast Map";
170 "Conditionally Perform weighted Pooling"; and
180 "Combine Approximation and Edge Scores".

The five steps (152 to 160) of the grouping 150 "Compute IQMs" are performed by the IQM computation subsystem 100 of FIG. 1.

In the step 152 "Perform N-level DWTs", N-level DWT operations are preformed on both the reference image X and the distorted image Y in the first and second N-level DWT modules 102 and 104 respectively. The N-level DWT is based on the Haar wavelet filter. With N-level decomposition, the approximation sub-bands $X_{A_N}$ and $Y_{A_N}$, as well as first and second detail sub-bands, are obtained.

The Haar wavelet has been used previously in some quality assessment and compression methods reported in M. R. Bolin and G. W. Meyer, "A visual difference metric for realistic image synthesis," in *Proc. SPIE Human Vision, Electron.* *Imag.*, vol. 3644, San Jose, Calif., 1999, pp. 106-120, and in Y.-K. Lai and C.-C. J. Kuo, "A Haar wavelet approach to compressed image quality measurement," *J. Visual Commun. Imag. Represent.*, vol. 11, no. 1, pp. 17-40, March 2000. For our framework, we chose the Haar filter for its simplicity and good performance. The Haar wavelet has very low computational complexity compared to other wavelets. In addition, based on our simulations, it provides more accurate quality scores than other wavelet bases. The reason for this is that symmetric Haar filters have a generalized linear phase, so the perceptual image structures can be preserved. Also, Haar filters can avoid over-filtering the image, owing to their short filter length. The number of decomposition levels (N) selected for structural or information-theoretic strategies, such as SSIM or VIF, is equal to one. The reason for this is that, for more than one level of decomposition, the resolution of the approximation sub-band is reduced exponentially and it becomes very small. Consequently, a large number of important image structures or information will be lost in that sub-band. But, for error-based approaches, like PSNR or absolute difference (AD), we can formulate the required decomposition levels N as follows: when an image is viewed at distance d from a display of height h, we have (as reported in Y. Wang, J. Ostermann, and Y-Q. Zhang, *Video Processing and Communications*. New Jersey: Prentice-Hall, 2002):

$$N \geq 0 \Rightarrow N = \max\left(0, \text{round}\left(\log_2\left(\frac{\min(H, W)}{(344/k)}\right)\right)\right)$$

(5)

Where the image is of size H×W and the viewing distance is d=k×h, and k is a constant factor typically set to 3, as typical viewers are positioned at a distance of approximately 3 times the picture height.

For a derivation of "N", please refer to an article by S. Rezazadeh and S. Coulombe, "A novel discrete wavelet transform framework for full reference image quality assessment" in Signal, Image and Video Processing, pp. 1-15, September 2011, which is incorporated herein by reference.

In the step 154 "Calculate Approximation Quality Map (or Score)", which is performed in the Approximation Quality Map/Score Computation Module 112, the quality map (or score) is calculated by applying IQM between the approximation sub-bands of $X_{A_N}$ and $Y_{A_N}$, which will be called an approximation quality map (or score) $IQM_A$. We have a quality map for map-based metrics such as SSIM. We have quality score otherwise (e.g. VIF). Examples of IQM computations applied to various quality metrics, such as SSIM and VIF, are presented further below.

In the step 156 "Form Estimate of Image Edges", which is performed in the first and second Detail Sub-band Aggregation Modules 106 and 108, first and second estimates $X_E$ and $Y_E$ of the image edges are formed for the reference image X and the distorted image Y respectively. The image using an aggregate of first detail sub-bands, where the aggregation of the first detail sub-bands is performed in the first Detail Sub-band Aggregation Modules 106. If the N-level DWT is applied to the images, the edge map (estimate) of image X is defined as:

$$X_E(m, n) = \sum_{L=1}^{N} X_{E,L}(m, n) \quad (6)$$

where $X_E$ is the edge map of X; and $X_{E,L}$ is the image edge map at decomposition level L, computed as defined in eq. (7). In eq. (7), $x_{H_L}$, $x_{V_L}$, and $x_{D_L}$ denote the horizontal, vertical, and diagonal detail subbands obtained at the decomposition level L for image X respectively. $x_{H_L,A_{N-L}}$, $x_{V_L,A_{N-L}}$, and $x_{D_L,A_{N-L}}$ are the wavelet packet approximation subbands obtained by applying an (N-L)-level DWT on $x_{H_L}$, $x_{V_L}$, and $x_{D_L}$ respectively. The parameters $\mu$, $\lambda$, and $\psi$ are constant. As the HVS is more sensitive to the horizontal and vertical subbands and less sensitive to the diagonal one, greater weight is given to the horizontal and vertical subbands. We arbitrarily propose $\mu=\lambda=4.5\psi$ in this document, which results in $\mu=\lambda=0.45$ and $\psi=0.10$ to satisfy eq. (8).

$$X_{E,L}(m,n) = \begin{cases} \sqrt{\mu \cdot (X_{H_L}(m,n))^2 + \lambda(X_{V_L}(m,n))^2 + \psi(X_{D_L}(m,n))^2} & \text{if } L = N \\ \sqrt{\mu \cdot (X_{H_L,A_{N-L}}(m,n))^2 + \lambda(X_{V_L,A_{N-L}}(m,n))^2 + \psi(X_{D_L,A_{N-L}}(m,n))^2} & \text{if } L < N \end{cases} \quad (7)$$

$$\mu+\lambda+\psi=1 \quad (8)$$

The edge map of Y is defined in a similar way for X.

Figure 2:
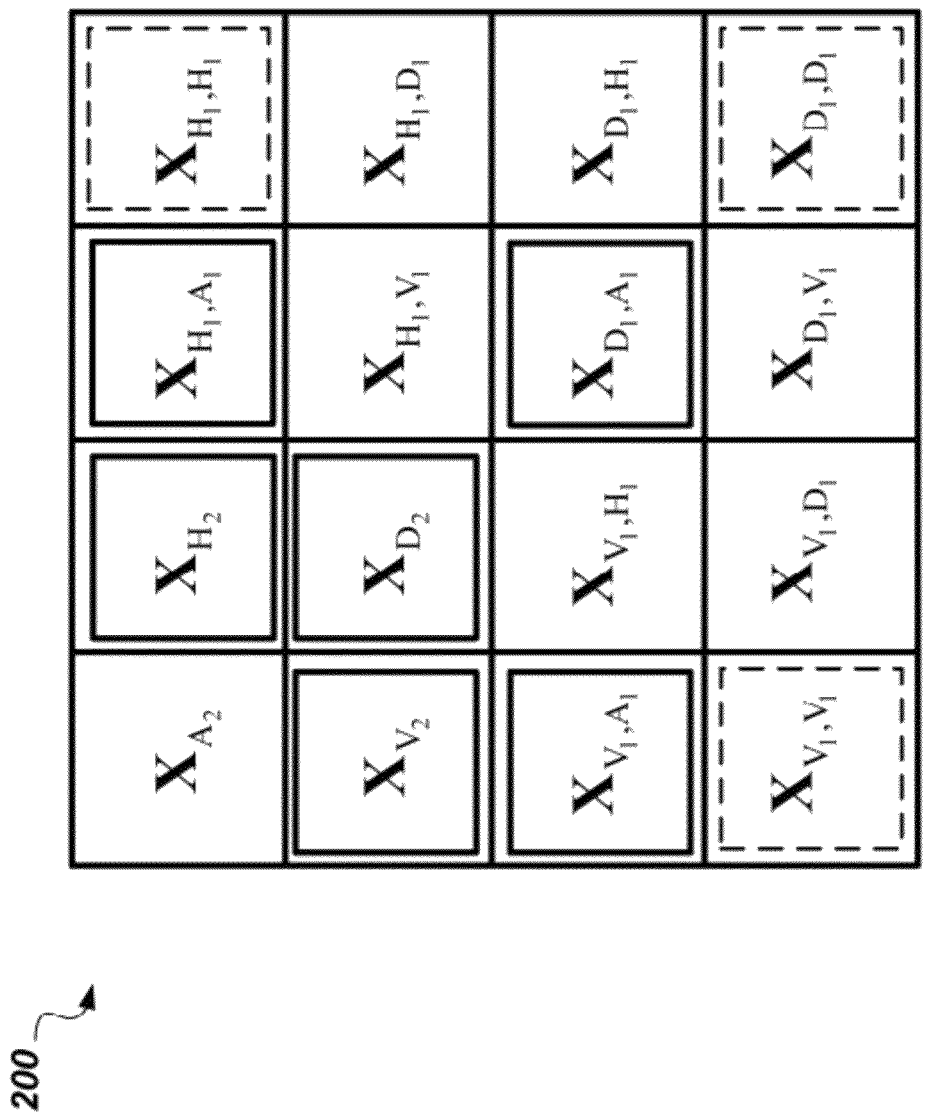
FIG. 2 shows an example diagram 200 depicting wavelet sub-bands for a two-level decomposition of the reference image X (N=2) of FIG. 1.

FIG. 2 shows an example diagram 200 depicting wavelet sub-bands for a two-level decomposition of the reference image X (N=2). The six sub-bands involved in computing the edge map are shown in bold outline in this figure. It is notable that the edge map is intended to be an estimate of image edges. Thus, the most informative sub-bands are used in forming the edge map, rather than considering all of the sub-bands. In our method, we use only 3N edge bands. If we considered all the bands in our edge map, we would have to use $4^N-1$ bands. When N is greater than or equal to 2, the value $4^N-1$ is much greater than 3N. Thus, our proposed edge map helps save computation effort. According to our simulations, considering all the image sub-bands in calculating the edge map does not have a significant impact on increasing prediction accuracy. It is notable that the edge maps only reflect the fine-edge structures of images.

The step 158 "Compute Edge Quality Map (or Score)" is performed in the Edge Quality Map/Score Computation Module 114. The IQM computation is applied between the edge maps $X_E$ and $Y_E$. The resulting quality map (or score) is called the edge quality map (or score), $IQM_E$.

Some metrics, like AD, also generate an intermediate quality map which should be pooled to reach the final score. In the step 160 "Conditionally Generate Contrast Map", when we have a map-based metric, a contrast map function is formed for pooling the approximation and edge quality maps. It is well known that the HVS is more sensitive to areas near the edges, as shown in Z. Wang and A. C. Bovik, *Modern Image Quality Assessment*. USA: Morgan & Claypool, 2006. Therefore, the pixels in the quality map near the edges should be given more importance. At the same time, high-energy (or high-variance) image regions are likely to contain more information to attract the HVS, as described in Z. Wang and X. Shang, "Spatial Pooling Strategies for Perceptual Image Quality Assessment," in *Proc. IEEE Int. Conf. Image Process.*, Atlanta, Ga., October 2006, pp. 2945-2948. Thus, the pixels of a quality map in high-energy regions must also receive higher weights (more importance). Based on these facts, we can combine our edge map with the computed variance to form a contrast map function. The contrast map is computed in the Contrast Map Generation Module 110 within a local Gaussian square window, which moves (pixel by pixel) over the entire edge maps $X_E$ and $Y_E$. As described in Z. Wang, A. Bovik, H. Sheikh, and E. Simoncelli, "Image quality assessment: From error visibility to structural similarity," *IEEE Trans. Image Process.*, vol. 13, no. 4, pp. 600-612, April 2004, we define a Gaussian sliding window $W=\{w_k | k=1, 2, \ldots, K\}$ with a standard deviation of 1.5 samples, normalized to unit sum. Here, we set the number of coefficients K to 16, that is, a 4×4 window. This window size is not too large and can provide accurate local statistics. The contrast map is defined as follows:

Contrast $$(x_E, x_{A_N}) = \left(\mu_{x_E}^2 \sigma_{x_{A_N}}^2\right)^{0.15} \quad (9)$$

$$\sigma_{x_{A_N}}^2 = \sum_{k=1}^{K} w_k (x_{A_N,k} - \mu_{x_{A_N}})^2 \quad (10)$$

$$\mu_{x_E} = \sum_{k=1}^{K} w_k x_{E,k}, \mu_{x_{A_N}} = \sum_{k=1}^{K} w_k x_{A_N,k} \quad (11)$$

where $x_E$ and $x_{A_N}$ denote image patches of $X_E$ and $X_{A_N}$ the sliding window. It is notable that the contrast map merely exploits the original image statistics to form the weighted function for quality map pooling.

Figure 3B:
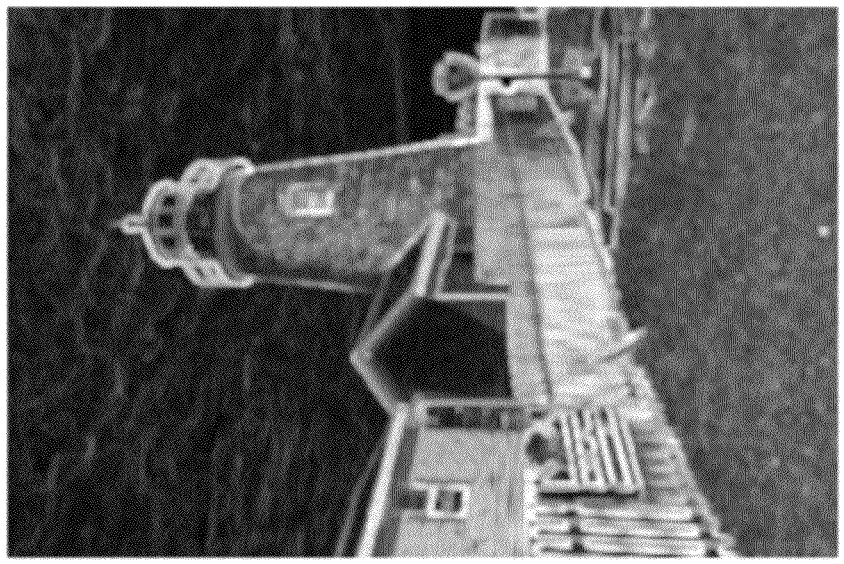
FIG. 3B demonstrates the resized contrast map obtained by eq. (9) for the original image of FIG. 3A.
Figure 3A:
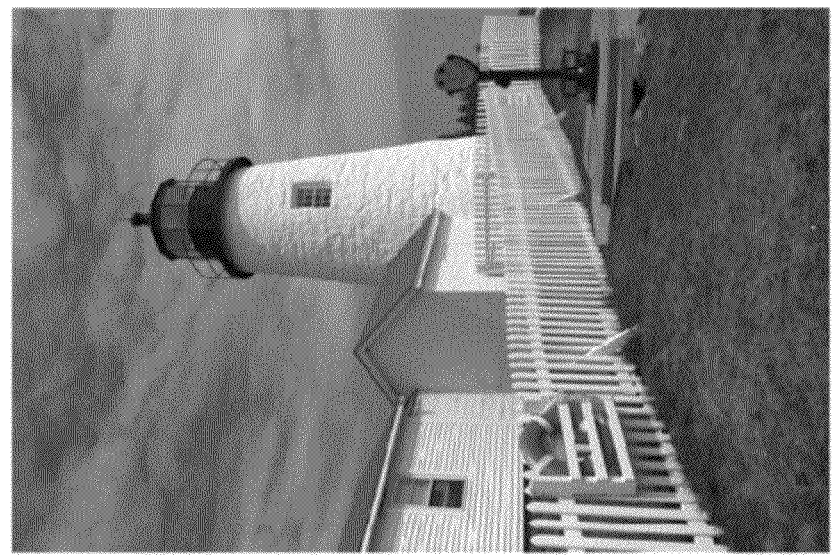
FIG. 3A shows a typical original image.

FIG. 3A shows a typical original image, and FIG. 3B demonstrates the resized contrast map obtained by eq. (9) for the original image of FIG. 3A. The sample values of the contrast map are scaled between [0, 255] for easy observation. As can be seen in FIGS. 3A and 3B, the contrast map nicely shows the edges and important image structures to the HVS. Brighter (higher) sample values in the contrast map indicate image structures that are more important to the HVS and play an important role in judging image quality.

For map-based metrics only, the contrast map in (9) is used in the step 170 "Conditionally Perform weighted Pooling" for weighted pooling of the approximation quality map $IQM_A$ and the edge quality map $IQM_E$.

$$S_A = \frac{\sum_{j=1}^{M} \text{Contrast}(x_{E,j}, x_{A_N,j}) \cdot IQM_A(x_{A_N,j}, y_{A_N,j})}{\sum_{j=1}^{M} \text{Contrast}(x_{E,j}, x_{A_N,j})} \quad (12)$$

-continued $$S_E = \frac{\sum_{j=1}^{M} \text{Contrast}(x_{E,j}, x_{A_N,j}) \cdot IQM_E(x_{E,j}, y_{E,j})}{\sum_{j=1}^{M} \text{Contrast}(x_{E,j}, x_{A_N,j})} \quad (13)$$

where $x_{E,j}$ and $x_{A_N,j}$ in the contrast map function denote image patches in the j-th local window; $x_{A_N,j}$, $y_{A_N,j}$, and $y_{E,j}$ in the quality map (or score) terms are image patches (or pixels) in the j-th local window position; M is the number of samples (pixels) in the quality map; and $S_A$ and $S_E$ represent the approximation and edge quality scores respectively.

It is noted that, for non map-based metrics like PSNR, the step 170 "Conditionally Perform weighted Pooling" is simply a copy function, so that $S_A = IQM_A$ and $S_E = IQM_E$. In the step 180 "Combine Approximation and Edge Scores", which is executed in the Combination Module 120, the approximation and edge quality scores are combined linearly, as defined in eq. (14), to obtain the overall quality score $IQM_{DWT}$ between images X and Y:

$$IQM_{DWT}(X, Y) = \beta \cdot S_A + (1 - \beta) \cdot S_E \quad (14)$$

$$0 < \beta \leq 1$$

where $IQM_{DWT}$ gives the final quality score between the images; and β is a constant. As the approximation sub-band contains the main image contents, β should be close to 1 to give the approximation quality score ($S_A$) much greater importance. We set β to 0.85 in our simulations, which means the approximation quality score constitutes 85% of the final quality score and only 15% is made up of the edge quality score.

Examples of Framework Applications

In this section, the application of the framework to different quality assessment methods is described. The PSNR approach is discussed in the error-based (bottom-up) category, where the AD metric is an example of a map-based metric, and PSNR is an example of a non map-based metric.

PSNR

The conventional PSNR and the mean square error (MSE) are defined as in eqs. (32) and (33):

$$PSNR(X, Y) = 10 \cdot \log_{10}\left(\frac{X_{max}^2}{MSE(X, Y)}\right) \quad (32)$$

$$MSE(X, Y) = \frac{1}{N_P} \cdot \sum_{m,n} (X(m, n) - Y(m, n))^2 \quad (33)$$

where X and Y denote the reference and distorted images respectively; $X_{max}$ is the maximum possible pixel value of the reference image X (the minimum pixel value is assumed to be zero); and $N_P$ is the number of pixels in each image. Although the PSNR is still popular because of its ability to easily compute quality in decibels (dB), it cannot adequately reflect the human perception of image fidelity. Other error-based techniques, such as wSNR[6] and NQM both proposed in N. Damera-Venkata, T. D. Kite, W. S. Geisler, B. L. Evans, and A. C. Bovik, "Image quality assessment based on a degradation model," *IEEE Trans. Image Process.*, vol. 9, no. 4, pp. 636-650, April 2000, and VSNR proposed in D. M. Chandler and S. S. Hemami, "VSNR: A wavelet-based visual signal-to-noise ratio for natural images," *IEEE Trans. Image Process.*, vol. 16, no. 9, pp. 2284-2298, September 2007, are more complex to use, as they follow sophisticated procedures to compute the human visual system (HVS) parameters. In this subsection, we explain how to calculate PSNR-based quality accurately in the discrete wavelet domain using the proposed framework. The first step is to determine the right number of decomposition levels (N) required to calculate the $PSNR_{DWT}$ value. This number can be calculated using eq. (5). Eq. (5) is used to compute the appropriate number of decomposition levels for the IVC database. For that database, k is equal to 6. Thus, $$N_{IVC} = \max(0, \text{round}(\log_2(512/57.33))) = 3 \quad (34)$$

Please note that the LCC has low sensitivity to small variations in β, that is, the proposed β=0.85 does not drastically affect $PSNR_{DWT}$ performance compared with the optimum β value for the quality prediction across different image databases.

In the second step, the edge-map functions of images X and Y are computed by eq. (6). Then the approximation quality score $PSNR_A$ and the edge quality score $PSNR_E$ are calculated using eq. (32), as defined in eq. (35) and eq. (36):

$$PSNR_A = PSNR(X_{A_N}, Y_{A_N}) \quad (35)$$

$$PSNR_E = PSNR(X_E, Y_E) \quad (36)$$

Finally, the overall quality score $PSNR_{DWT}$ is computed by combining approximation and edge quality scores according to eq. (14):

$$PSNR_{DWT}(X, Y) = \beta \cdot PSNR_A + (1-\beta) \cdot PSNR_E, \; 0 < \beta \leq 1 \quad (37)$$

where $PSNR_{DWT}$ gives the final quality score, or measure of quality, of the images in dB.

Absolute Difference (AD)

To verify the performance of the proposed framework of FIG. 1 more generally, it is appropriate to investigate how it works if the AD of the images is considered as the IQM. As in previous cases, it is necessary to know the required number of decomposition levels in order to calculate the $AD_{DWT}$ value.

In the second step of this map-based method, an approximation AD map, $AD_A$ is calculated, between the approximation sub-bands of X and Y.

$$AD_A(m, n) = |X_{A_N}(m, n) - Y_{A_N}(m, n)| \quad (38)$$

where (m,n) shows a sample position in the approximation subband.

In the third step, the edge-map function images X and Y are defined in eqs. (6), (7), and the edge AD map, $AD_E$, is calculated between the edge maps $X_E$ and $Y_E$ in the next step.

$$AD_E(m,n) = |X_E(m, n) - Y_E(m, n)| \quad (39)$$

In the fourth step, the contrast map is obtained using eq. (9), and then $AD_A$ and $AD_E$ are pooled using the contrast map to calculate the approximation and edge quality scores $S_A$ and $S_E$.

$$S_A = \frac{\sum_{j=1}^{M} \text{Contrast}(m, n) \cdot AD_A(m, n)}{\sum_{j=1}^{M} \text{Contrast}(m, n)} \quad (40)$$

$$S_E = \frac{\sum_{j=1}^{M} \text{Contrast}(m, n) \cdot AD_E(m, n)}{\sum_{j=1}^{M} \text{Contrast}(m, n)} \quad (41)$$

The final quality score, $AD_{DWT}$, is calculated using eq. (42).

$$AD_{DWT}(X, Y) = \beta \cdot S_A 30 \, (1-\beta) \cdot S_E \quad (42)$$

Detailed Analysis of Problem to be Solved

Let's consider an image segmented into 4×4 blocks. Each block is subject to 4×4 DCT transform and alteration of its frequency coefficients. These alterations can include quantization, suppression (set to zero), etc. Such operation is commonplace in H.264 compression.

FIG. 4 shows a Matlab code fragment 900 for generating and displaying the 4×4 DCT basis used in H.264 compression.

Figure 5:
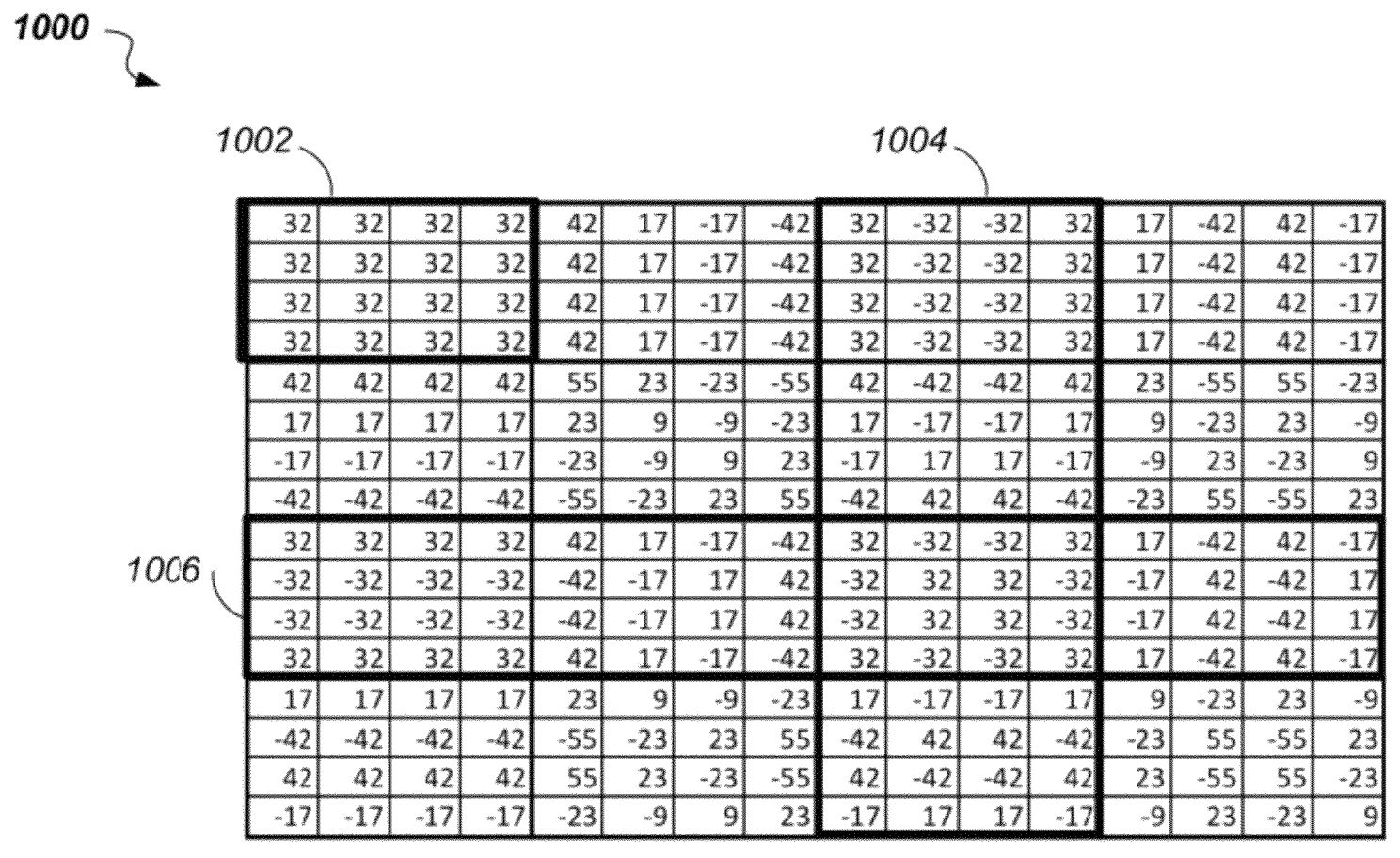

FIG. 5 shows a number array 1000 illustrating results of the 4×4 DCT basis from FIG. 4, calculated at an arbitrary scale, and showing numeric patterns in each of the 4×4 heavily outlined squares. The square at the top-left position (reference numeral 1002) corresponds to the DC basis, representing a constant pixel level. FIG. 5 shows various combinations of horizontal and vertical frequency patterns comprising 16 values in each 4×4 square.

Each pattern square comprises 16 numerical values which, by definition, average to zero, except the top left pattern square 1002 corresponding to the DC component. Therefore the proposed metrics would not be able to detect any distortions by summing any of these patterns when using a Haar transform with a decomposition level of 2, which is operating on 4×4 blocks as the approximation band for a 2×2 Haar transform with level of 2 becomes the average over 4×4 blocks. Furthermore, computing the average of each of these patterns on each of their 2×2 sub-blocks, we obtain, using the same Matlab code, a mask showing which coefficients have zero average for each of their 2×2 sub-blocks, shown with a "1" in the following array denoted "sym".

$$sym = \begin{matrix} 0 & 0 & 1 & 0 \\ 0 & 0 & 1 & 0 \\ 1 & 1 & 1 & 1 \\ 0 & 0 & 1 & 0 \end{matrix}$$

This may also be determined directly in FIG. 5 which shows that individual 2×2 sub-blocks in the third column (reference numeral 1004) as well in the third row (reference numeral 1006) sum to zero.

It can be seen that a metric, based on using a 2×2 Haar transform, would be blind to any modification affecting frequency coefficients in the 3rd row or in the 3rd column.

Besides, the approximation band of the 2×2 Haar transform being blind to such image patterns (i.e. the pixel patterns associated with the DCT basis frequency coefficients in the 3rd row or in the 3rd column), other block operations belonging to a transform may be blind to certain image patterns (in the previous example, in the approximation band, the block operation computing the average of the pixels in the block). For a block operation T, the set of block patterns of the image that cannot be recognized, i.e. for which T has a blindness, is defined as the set of blocks B for which T(B) is zero, or substantially zero. We denote this set "Null(T)" as null space due to its similarity to the concept of null space when dealing with vector spaces. Indeed, a null space is a subspace of a vector space having vectors that under a given linear transformation are mapped onto zero, or substantially zero. Therefore, we define: $\text{Null}(T) = \{B | T(B) = 0\}$.

Let C be a block composed of B and its horizontal, vertical and diagonal repetitions. Mathematically, we have:

$$C = \begin{bmatrix} B & B \\ B & B \end{bmatrix}$$

For instance, if:

$$B = \begin{bmatrix} a & b \\ c & d \end{bmatrix}$$

Then $$C = \begin{bmatrix} a & b & a & b \\ c & d & c & d \\ a & b & a & b \\ c & d & c & d \end{bmatrix}$$

Let $S = (sx, sy)$ be a spatial shift and B' be a block extracted from C starting at location S and with same dimension as B (i.e. both of size W×W). We have:

B'(i,j) = C(i+sx, j+sy), for i,j both between 0 and W-1.
where both sx and sy are between 1 and W-1.
In the previous example, with S=(1,1), we have:

$$B' = \begin{bmatrix} d & c \\ b & a \end{bmatrix}$$

We denote this spatial shift operation over the repetitions of B as R(B,S) where B is the block and S the spatial shift. We have B'=R(B,S).

What we want is to select a spatial shift S for which as many elements of Null(T) as possible become recognized under the spatial shift (i.e. the block transform applied to spatially shifted images is not blind anymore). Ideally, we would like that the spatial shift S be selected such that T(R(B,S)) is not zero for each B element of Null(T) (except when B is zero everywhere).

In the 4×4 DCT basis example above, if we apply a spatial shift of S=(1,1), then the approximation band of the 2×2 Haar transform will not be blind to the 3rd row or 3rd column of frequency coefficients. For other block operations, spatial shift values can be determined which would reduce and often minimize the blindness of the transformation process.

Generally, the transformation process has a blindness property of not containing all information regarding an image to be transformed in a transform of the image, thus resulting in certain patterns of the image not to be recognized during the transformation process, and the spatial shift being chosen so that the above mentioned certain patterns become detectable during the transformation process applied to the spatially shifted versions X2 and Y2.

Spatial Shifting

According to embodiments of the invention, a spatial shift horizontally and vertically is introduced in the block alignment of the W×W pixel blocks in images for computing Haar-based visual quality metrics, in order to reduce "blindness", thereby increasing the accuracy and robustness of the visual quality metrics calculation.

Spatial shifting may also be used beneficially for deriving robust quality metrics which are based on using averages of square pixel blocks.

Figure 6:
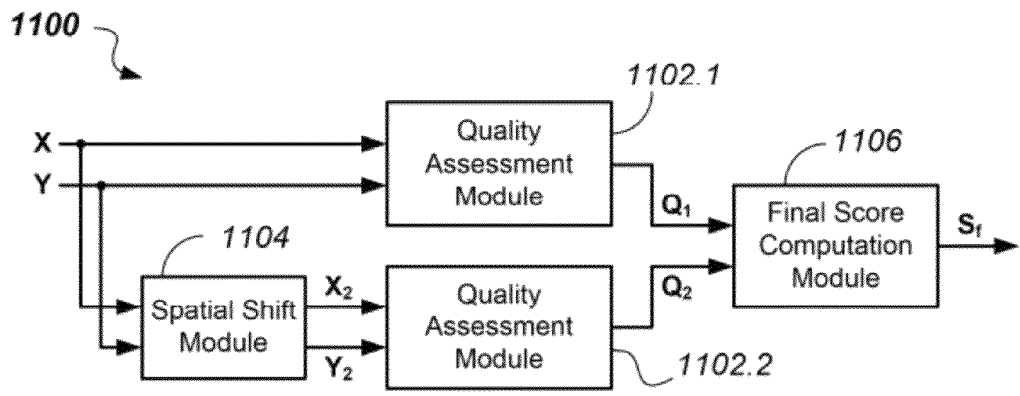
FIG. 6 illustrates a first quality metrics computation system 1100, including two instances (1102.1 and 1102.2) of a Quality Assessment module 1102, a Spatial Shift module 1104, and a Final Score Computation module 1106.

FIG. 6 illustrates a first quality metrics computation system 1100, including two instances (1102.1 and 1102.2) of a Quality Assessment module 1102, a Spatial Shift module 1104, and a Final Score Computation module 1106.

Figure 7:
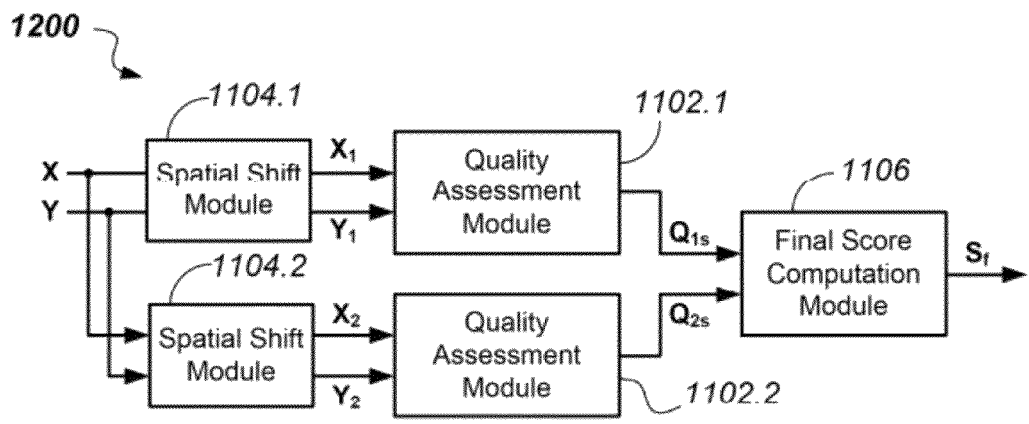
FIG. 7 illustrates a second quality metrics computation system 1200 including two instances (1102.1 and 1102.2) of the Quality Assessment module 1102, two instances (1104.1 and 1104.2) of the Spatial Shift module 1104, and the Final Score Computation module 1106.

FIG. 7 illustrates a second quality metrics computation system 1200, which is a different arrangement of the same modules used in the first quality metrics computation system 1100. The second quality metrics computation system 1200 includes two instances (1102.1 and 1102.2) of the Quality Assessment module 1102, two instances (1104.1 and 1104.2) of the Spatial Shift module 1104, and the Final Score Computation module 1106.

Figure 8:
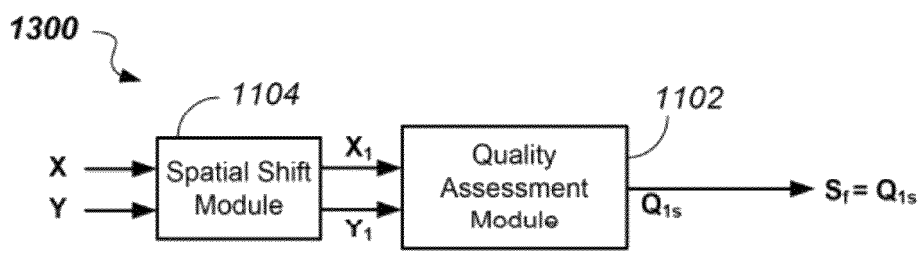
FIG. 8 illustrates a third quality metrics computation system 1300 including the Quality Assessment module 1102 and the Spatial Shift module 1104.

FIG. 8 illustrates a third quality metrics computation system 1300, which is yet another different arrangement of some of the same modules used in the first quality metrics computation system 1100. The third quality metrics computation system 1300 includes the Quality Assessment module 1102 and the Spatial Shift module 1104.

All three quality metrics computation systems 1100, 1200, and 1300 have in common that a final quality score $S_f$ is computed by processing of the two images, the original image X and the distorted image Y. The Spatial Shift module 1104 has the general ability to shift the pixels of both the original image X and the distorted image Y by predefined horizontal and vertical amounts, or number of pixels, relative to the image frame. The Quality Assessment module 1102 has the ability to compare the original image X with the distorted image Y, or shifted versions of the 2 images, and generate a Quality Metric Q. The Final Score Computation module 1106 is used to combine the Quality Metrics from two Quality Assessment modules 1102.

The effect of spatial shifting is to cause different pixels from the image to be selected for the transformation blocks. By combining the Quality Metrics computed with differently shifted source images, the aforementioned "blindness" of Haar-based metrics may be overcome.

According to one embodiment of the invention, spatial shifts are simply applied horizontally and vertically such that the metric is not aligned with the 4×4 block alignments used in H.264 as illustrated in the third quality metrics computation system 1300 of FIG. 8.

In another embodiment, designed for use in cases where it is not known where the 4×4 block alignment is located, the metric is computed at two locations separated with a spatial shift, which is preferably an odd number of pixels both horizontally and vertically as shown in FIGS. 6 and 7. In FIG. 6, one of the two locations is at the origin (no spatial shift corresponding to that location) while both spatial shifts may be arbitrarily selected in FIG. 7.

The preferred embodiment is illustrated in FIG. 6, for W×W blocks, the spatial shift is by first and second predefined amounts (numbers of pixels), both selected to be the larger of 1 and (W/2−1), horizontally and vertically respectively. This corresponds to a near quincunx pattern for the quality metric application. In the first quality assessment, blocks are shifted by 0. In the second quality assessment, the blocks are shifted by (x, y). Quincunx is a pattern for which the pixel content of the blocks of the shifted version by (x, y) is maximally different from the blocks shifted by 0. If block size is W, this maximum differentiation would happen when (x, y)=(W/2, W/2). We describe the spatially shifted pattern as near-quincunx because we want to have this maximum differentiation property by having (x, y) near (W/2, W/2) but also want to have x and y odd to avoid symmetries which could be causing problems with the Haar transform.

The results of the two metrics may be either averaged or the maximum distortion value of each individual application of the metric may be selected, to provide the final result.

Simulation results have shown that these alternatives increase the metric robustness without affecting overall accuracy, see experimental results below.

The quality metrics computation system 1300 of FIG. 8 above has the same computational complexity as the original metric.

The quality metrics computation systems 1100 and 1200 of FIG. 6 and FIG. 7 respectively possess double the computational complexity compared to the quality metrics computation system 1300, but its complexity is still much lower compared to that of other accurate visual quality metrics such as SSIM and VIF.

The quality metrics computation system 1100 computes, using the quality assessment module 1102.1, a quality score $Q_1$ between the original image X and the distorted image Y. In addition, it computes, using the quality assessment module 1102.2, a quality score $Q_2$ between shifted images $X_2$ and $Y_2$, which are spatially shifted versions of the original image X and the distorted image Y respectively, generated by the spatial shift module 1104. Formally:

$$X_2(m,n)=X(m+s_{2,x},n+s_{2,y})$$

$$Y_2(m,n)=Y(m+s_{2,x},n+s_{2,y})$$

where (m,n) is the pixel position in the image, $s_{2,x}$ is the horizontal shift and $s_{2,y}$ is the vertical shift of the spatial shift module 1104.

$$Q_1=\text{VQM}(X, Y)$$

$$Q_2=\text{VQM}(X_2, Y_2)$$

where VQM(X, Y) is a visual quality metric function performing quality assessment, in the quality assessment module 1102.1, from images X and Y. VQM($X_2$, $Y_2$) is a visual quality metric function performing quality assessment, in quality assessment module, from the shifted images $X_2$ and $Y_2$. VQM may be any visual quality metric such as the SSIM, $PSNR_A$, etc.

The final quality score, or the measure of quality, $S_f$ is computed in the final score computation module 1106 based on $Q_1$ and $Q_2$. The final score can be computed using a weighted sum of $Q_1$ and $Q_2$, taking the minimum or other appropriate operations depending on the context.

The Weighted sum may be computed as follows:

$$S_f=a(Q_1)+(1-a)(Q_2) \text{ with } 0<=a<=1.$$

As a special case, one would obtain the mean by setting a=0.5.

The weighted sum is useful in assigning different levels of importance to each quality score.

The Minimum may be computed as follows:

$$S_f=\text{Min}(Q_1, Q_2).$$

The minimum is useful to take the worst case of the two quality scores.

More complex operations:

Sometimes, the final score is advantageously a more complex function of the quality scores. For instance, for $PSNR_A=10\log_{10}((2^L(255))^2/mse)$, the quality scores to combine would be the mse. And one would have:

$Q_1=mse_1$
$Q_2=mse_2$

Then several options are possible:
$mse=Max(Q_1, Q_2)$
$mse=a(Q_1)+(1-a)(Q_2)$ with $0<=a<=1$
    such as $mse=(0.5)(Q_1)+(0.5)(Q_2)$ when $a=0.5$
$S_f=10\log_{10}((2^L(255))^2/mse)$, where L is the number of decomposition levels in $PSNR_A$ and mse represents the mean squared error and is defined as:

$$mse = \frac{1}{MN}\sum_{i=m,j=n}^{M,N}([X(m,n)-Y(m,n)])^2$$

where M and N are the image dimensions.

Please note that specific values of spatial shifts $s_{2,x}$ and $S_{2,y}$ can be beneficial to make a metric robust to distortions. For instance, the 4×4 discrete cosine transform (DCT) is used in H.264 video compression. Often, the high frequency coefficients of a DCT-transforrned block of pixels are heavily quantized to increase compression in H.264. But this introduces distortions. Unfortunately, as seen in the previous section, the $PSNR_A$ metric, when using a 2×2 Haar transform with a decomposition level of 2, which is operating on 4×4 blocks aligned with the 4×4DCTs of H.264 compression (as is the case by default), would not be able to detect these distortions since they do not alter the average pixel value within each 4×4 block.

A solution to the problem is to use an odd spatial shift horizontally and vertically so that not only the 2×2 Haar transform with a decomposition level of 2 would not be aligned with the H.264 4×4 DCT blocks but also that this misalignment would then not permit 4×4DCT coefficients having an even symmetry to remain undetected for any number of levels of the Haar transform (i.e. any average of W×W blocks with W being a power of 2).

Therefore, for $PSNR_A$, it is suggested to set the shift values to max(1, W/2-1) for block sizes of W for the Haar transform. Computing the quality metric twice but with the second one being applied from a well-chosen shifted position, as described here, will avoid the situation in which both metrics miss distortions having specific symmetry patterns. This is especially useful when the alignment of a potential distortion is unknown, for example, if the actual alignment of the 4×4DCT transforms is not known, for instance in the case where the image was encoded and decoded with H.264 and then cropped.

The quality metrics computation system 1200 computes, again using the quality assessment module 1102.1, a quality score $Q_{1s}$ between shifted images $X_1$ and $Y_1$, which are spatially shifted versions, generated by the spatial shift module 1104.1, of the original image X and the distorted image Y respectively. In addition, the quality metrics computation system 1200 computes, using the quality assessment module 1102.2, the quality score $Q_{2s}$ between the shifted images $X_2$ and $Y_2$, which are spatially shifted versions, generated by the spatial shift module 1102.2 of the original image X and the distorted image Y respectively. Formally:

$X_1(m,n)=X(m+s_{1,x},n+s_{1,y})$ $Y_1(m,n)=Y(m+s_{1,x},n+s_{1,y})$ $X_2(m,n)=X(m+s_{2,x},n+s_{2,y})$ $Y_2(m,n)=Y(m+s_{2,x},n+s_{2,y})$ where (m,n) is the pixel position in the image, $s_{1,x}$ is the horizontal shift and $s_{1,y}$ is the vertical shift of the spatial shift module 1102.1, and $s_{2,x}$ is the horizontal shift and $s_{2,y}$ is the vertical shift of the spatial shift module 1102.2.

$Q_{1s}=VQM(X_1, Y_1)$ $Q_{2s}=VQM(X_2, Y_2)$ where VQM(X, Y) is as described previously.

The final quality score $S_f$ is computed in the final score computation module 1106 based on $Q_{1s}$ and $Q_{2s}$. As described previously.

The same comment made with regard to FIG. 6 regarding the spatial shift applies here as well. It may further noted that specific values of spatial shifts $s_{1,x}$, $s_{1,y}$, $s_{2,x}$, and $s_{2,y}$ can be very beneficial to make the metric robust to distortions. For $PSNR_A$, it is suggested that a difference between the shift values $s_{1,x}-s_{2,x}$ be an odd number, and the difference between the shift values $s_{1,y}-s_{2,y}$ also be an odd number. It is further recommended that $s_{1,x}-s_{2,x}=s_{1,y}-s_{2,y}=\max(1, W/2-1)$ for block sizes of W for the Haar transform.

The quality metrics computation system 1300 computes, using the quality assessment module 1102, the quality score $Q_{1s}$ between image $X_1$ and $Y_1$, which are spatially shifted versions, generated by the spatial shift module 1104, of the original image X and the distorted image Y respectively.

Formally:

$X_1(m,n)=X(m+s_{1,x},n+s_{1,y})$ $Y_1(m,n)=Y(m+s_{1,x},n+s_{1,y})$ where (m,n) is the pixel position in the image, $s_{1,x}$ is the horizontal shift value and $s_{1,y}$ is the vertical shift value used in the spatial shift module 1104.

$Q_{1s}=VQM(X, Y)$ where VQM(X, Y) is as described previously.

The final quality score, or measure of quality, $S_f=Q_{1s}$.

The same comment made with regard to FIG. 6 regarding the spatial shift applies here as well. Here, the metric is computed only once but a spatial shift is applied in order to avoid alignment with distortions. This may be especially useful when the alignment of a distortion is known, for example, if the alignment of the 4×4DCT transforms is known to be on even locations, it is advantageous to apply an odd shift. For $PSNR_A$, shift value equal to 1 is suggested.

Additional embodiments of the invention may be based on an analogous use of more combinations of locations, generated by spatial shift of the original and distorted images X and Y, for the computation of $PSNR_A$. The same method, involving images and shifted versions of the images in combination, may also be applied to other wavelet based metrics besides Haar, and to other Haar transform sizes. Using more combinations of locations, i.e. shifted positions may, depending on each situation, increase robustness at the expense of increased computational complexity. A person skilled in the art of digital signal processing will know how to adapt the invention presented herein to other Haar transform sizes, and wavelets depending on the application of interest.

Figure 9:
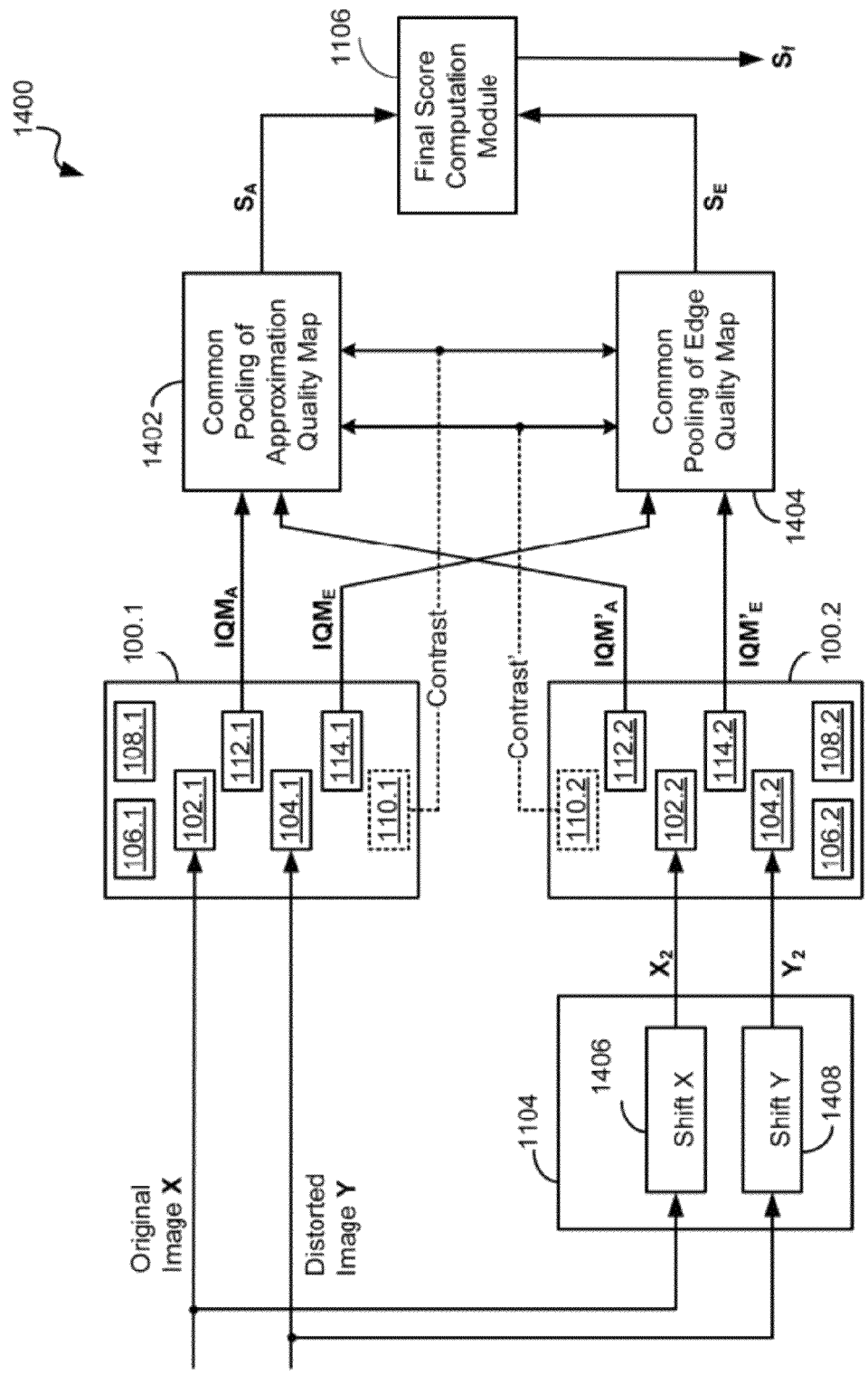
FIG. 9 shows a block diagram of an embodiment of a discrete wavelet domain image quality assessment system 1400.

FIG. 9 shows a block diagram of an embodiment of a discrete wavelet domain image quality assessment system 1400, as a preferred implementation of the first quality metrics computation system 1100 of FIG. 6. The discrete wavelet domain image quality assessment system 1400 comprises:

first and second IQM computation subsystems 100.1 and 100.2, each corresponding to an instance of the IQM computation subsystem 100 of FIG. 1, the Spatial Shift module 1104 of FIG. 6, an Common Pooling of Approximation Quality Map Module 1402, an Common Pooling of Edge Quality Map Module 1404, and the Final Score Computation module 1106 of FIG. 6 which is equivalent to the Combination Module 120 of FIG. 1.

The inputs to the discrete wavelet domain image quality assessment system 1400 are the Reference (original) Image X and the Distorted Image Y, and the final output of the system 1400 is the final quality score $S_f$ as in FIG. 6.

The Spatial Shift module 1104 includes a Shift X module 1406 for generating the spatially shifted version $X_2$ of the Original image X, and a Shift Y module 1408 for generating the spatially shifted version $Y_2$ of the distorted image Y.

The first IQM computation subsystems 100.1 computes a first approximation quality map (or score) $IQM_A$, a first Edge Quality Map (Score) $IQM_E$, and optionally a first contrast map labeled "Contrast", based on a comparison of the images X and Y. Similarly, the second IQM computation subsystems 100.2 computes a second approximation quality map (or score) $IQM'_A$, a second Edge Quality Map (Score) $IQM'_E$, and optionally a second contrast map labeled "Contrast' ", based on the spatially shifted versions $X_2$ and $Y_2$ of the images X and Y respectively. The first and second approximation quality maps (scores) $IQM_A$ and $IQM'_A$ for the approximation sub-bands are combined in the Common Pooling of Approximation Quality Map module 1402. The first and second Edge Quality Maps (scores) $IQM_E$ and $IQM'_E$ for the detail sub-bands are combined in the Common Pooling of Edge Quality Map module 1404.

Both, the Common Pooling of Approximation Quality Map module 1402 and the Common Pooling of Edge Quality Map module 1404 also optionally receive the contrast maps "Contrast" and "Contrast' ", and output the approximation quality score $S_A$ and the edge quality score $S_E$ respectively to the Final Score Computation module 1106 which combines them into the Final Score $S_f$ also referred to as a final measure of quality.

The inputs to the second IQM computation subsystem 100.2, after the spatial shift operation performed in the Spatial Shift module 1104, are:

$$X_2(m,n)=X(m+s_x,n+s_y)$$

$$Y_2(m,n)=Y(m+s_x,n+s_y)$$

Figure 10:
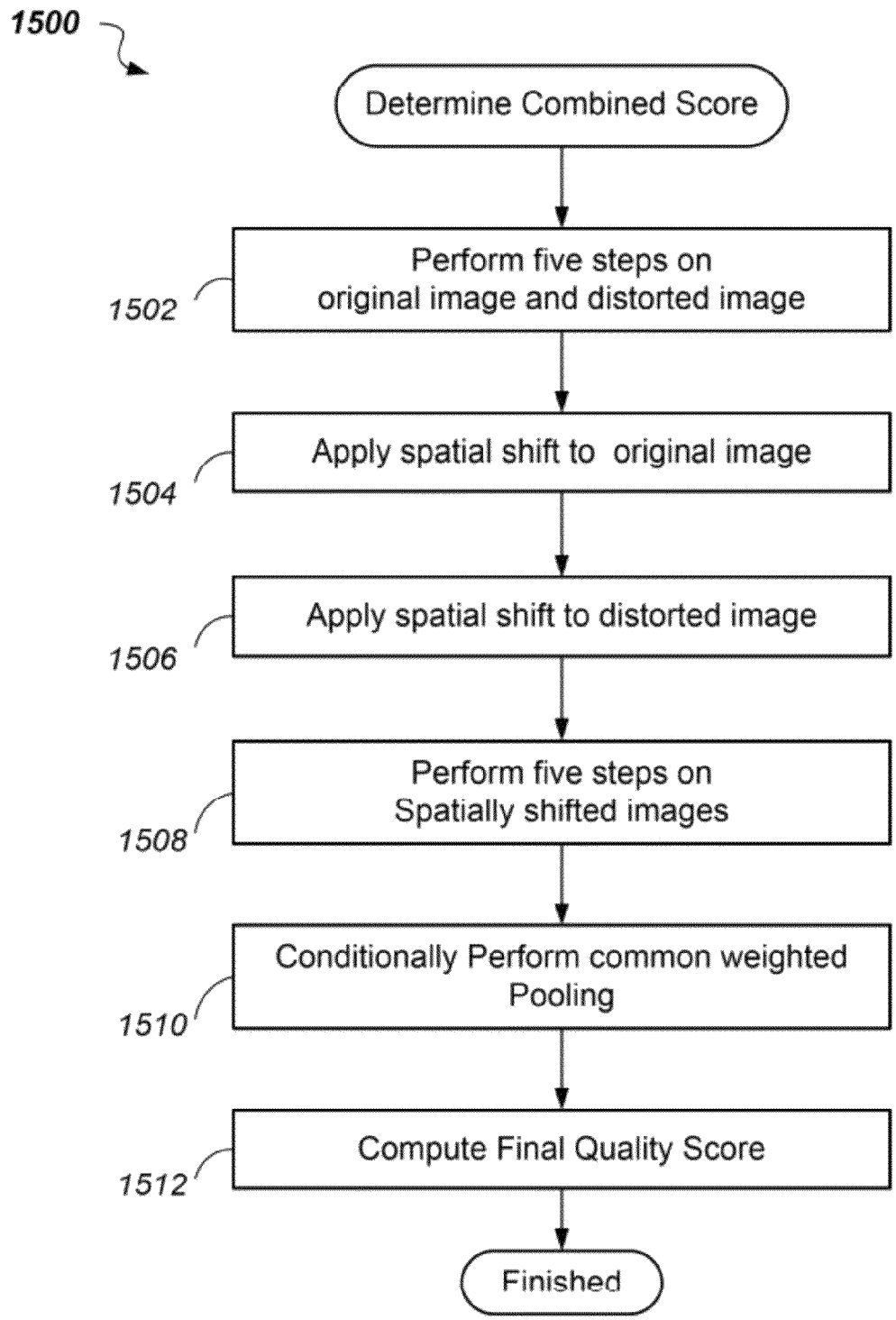
FIG. 10 shows a flowchart of a method 1500 of computing a combined score which is a measure of quality of a distorted image by comparison with a corresponding original image, combined with a comparison of a spatially shifted version of the distorted image with an equally spatially shifted version of the corresponding original image, in a sequence chart associated with the system block diagram of FIG. 9.

FIG. 10 shows a flowchart of a method 1500 of computing a combined score which is a measure of quality of a distorted image by comparison with a corresponding original image, combined with a comparison of a spatially shifted version of the distorted image with an equally spatially shifted version of the corresponding original image, in a sequence chart associated with the system block diagram of FIG. 9.

The method 1500 comprises steps:
1502 "Perform five steps on original image and distorted image";
1504 "Apply spatial shift to original image";
1506 "Apply spatial shift to distorted image";
1508 " Perform five steps on spatially shifted images";
1510 "Conditionally Perform common weighted Pooling"; and
1512 "Compute Final Quality Score".

Except for the initial spatial shift which is performed in the Spatial Shift module 1104 to provide the shifted images $X_2$ and $Y_2$ to the second IQM computation subsystem 100.2, each subsystem is the same as the IQM computation subsystem 100 of FIG. 1 described earlier, except the final step 1512 "Compute Final Quality Score". Accordingly, the method 1500 includes a first step group 1502 and a second step group 1508, each of essentially the same five steps as the steps 152 to 160 of FIG. 1A.

The first step group 1502, which corresponds to the actions of the first IQM computation subsystems 100.1 to perform the steps 152 to 160 on the original image and the distorted image, is followed by the steps 1504 "Apply spatial shift to original image" and 1506 "Apply spatial shift to distorted image", in which spatially shifted versions of the original and the distorted images respectively are generated.

The next steps are in the step group 1508, which corresponds to the actions of the second IQM computation subsystems 100.2 to perform the steps 152 to 160 on the spatially shifted versions of the original image and the distorted image.

Figure 10A:
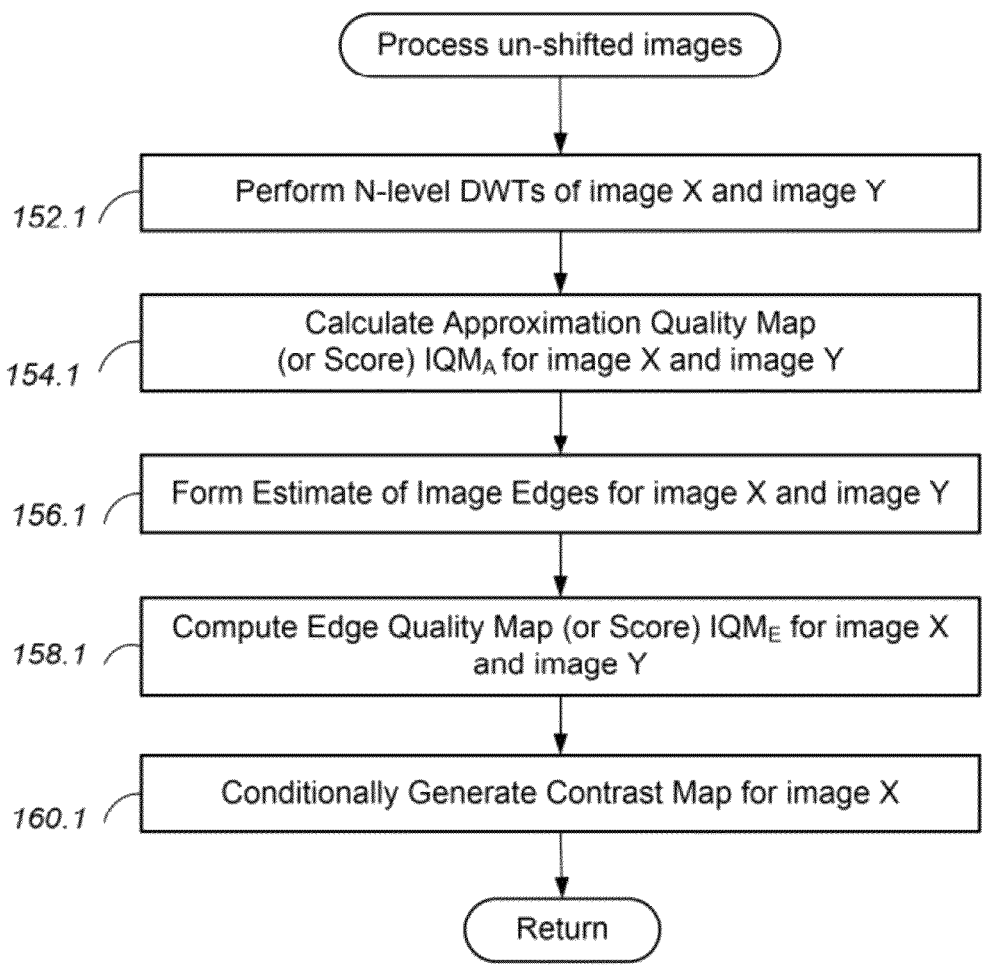
FIG. 10A shows an expansion of the five-step group 1502 of FIG. 10.
Figure 10B:
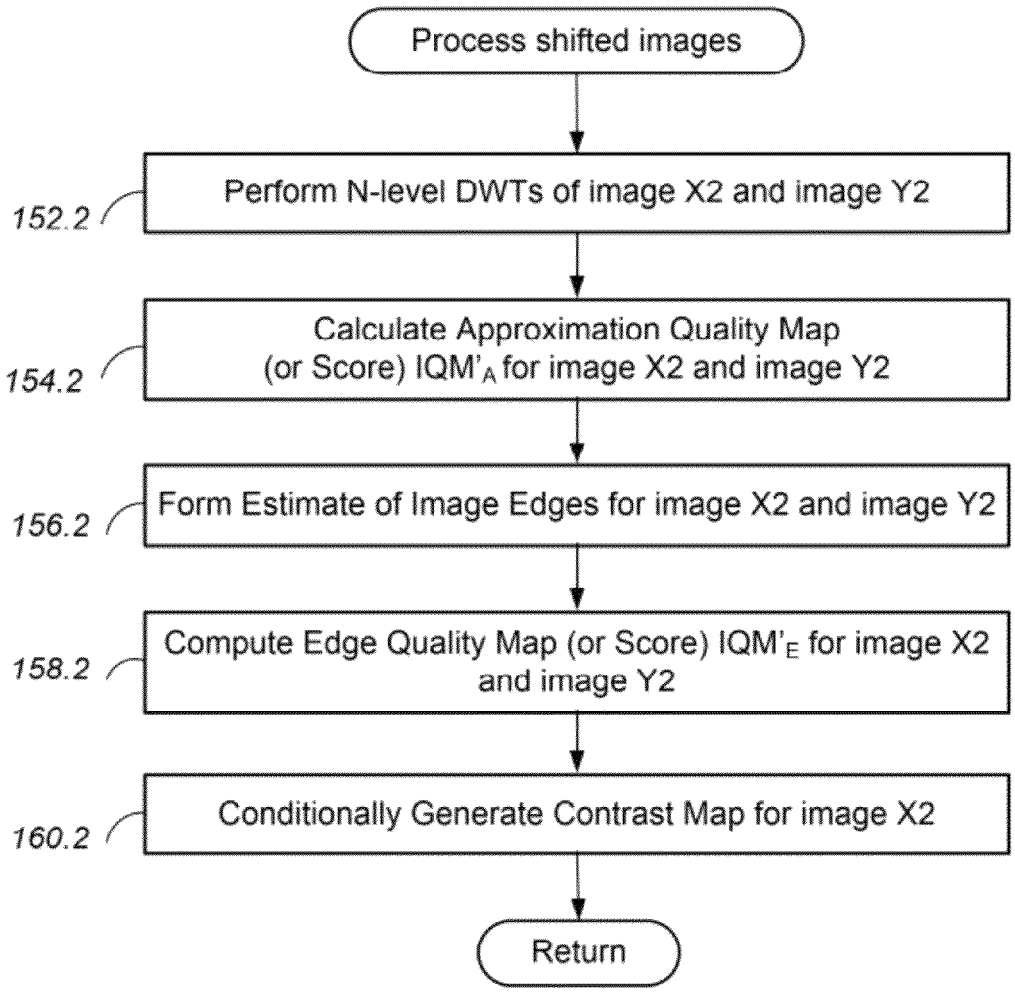
FIG. 10B shows an expansion of the five-step group 1508 of FIG. 10.

For clarity, the two five-step groups 1502 and 1508 are expanded to individual steps, and shown in FIGS. 10A and 10B respectively, indicating the arguments of each step.

However, the step 170 "Conditionally Perform weighted Pooling" of FIG. 1A is replaced in FIG. 10 with the new step 1510 "Conditionally Perform common weighted Pooling" which is performed in the Common Pooling of Approximation Quality Map module 1402 and the Common Pooling of Edge Quality Map module 1404 as described in more detail below.

In the final step 1512 "Compute Final Quality Score" of combining approximation and edge scores, the approximation quality score $S_A$ and the edge quality score $S_E$ are computed.

The step 1512 is performed in the Final Score Computation module 1106, and corresponds exactly to the step 180 of FIG. 1A.

The step 1510 "Conditionally Perform common weighted Pooling" uses the Contrast and Contrast' maps for weighted pooling in the case of map-based metrics but can be omitted when other types of metrics are used.

For map-based metrics, the contrast map of equation (9) is used for weighted pooling of the approximation quality maps $IQM_A$ and $IQM'_A$ and the edge quality maps $IQM_E$ and $IQM'_E$.

$$S_A = \frac{1}{2}\left[\frac{\sum_{j=1}^{M} \text{Contrast}(x_{E,j}, x_{A_N,j}) \cdot IQM_A(x_{A_N,j}, y_{A_N,j})}{\sum_{j=1}^{M} \text{Contrast}(x_{E,j}, x_{A_N,j})} + \frac{\sum_{j=1}^{M} \text{Contrast}'(x'_{E,j}, x'_{A_N,j}) \cdot IQM'_A(x'_{A_N,j}, y'_{A_N,j})}{\sum_{j=1}^{M} \text{Contrast}'(x'_{E,j}, x'_{A_N,j})}\right] \quad (44)$$

$$S_E = \frac{1}{2}\left[\frac{\sum_{j=1}^{M}\text{Contrast}(x_{E,j}, x_{A_N,j}) \cdot IQM_E(x_{E,j}, y_{E,j})}{\sum_{j=1}^{M}\text{Contrast}(x_{E,j}, x_{A_N,j})} + \frac{\sum_{j=1}^{M}\text{Contrast}'(x'_{E,j}, x'_{A_N,j}) \cdot IQM'_E(x'_{E,j}, y'_{E,j})}{\sum_{j=1}^{M}\text{Contrast}'(x'_{E,j}, x'_{A_N,j})}\right] \quad (45)$$

where $x_{E,j}$ and $x_{A_N,j}$ in the contrast map function denote image patches in the j-th local window related to image X; $x'_{E,j}$ and $x'_{A_N,j}$ in the contrast map function denote image patches in the j-th local window related to image X'; $x_{A_N,j}$, $y_{A_N,j}$, $x_{E,j}$, and $y_{E,j}$ in the quality map (or score) terms are image patches (or pixels) in the j-th local window position related to images X and Y; $x'_{A_N,j}$, $y'_{A_N,j}$, $x'_{E,j}$, and $y'_{E,j}$ in the quality map (or score) terms are image patches (or pixels) in the j-th local window position related to images X' and Y'; M is the number of samples (pixels) in the quality map; and $S_A$ and $S_E$ represent the approximation and edge quality scores respectively.

As for the previous section, we can combine the quality scores differently. For instance:

$$V_A = \left[\frac{\sum_{j=1}^{M}\text{Contrast}(x_{E,j}, x_{A_N,j}) \cdot IQM_A(x_{A_N,j}, y_{A_N,j})}{\sum_{j=1}^{M}\text{Contrast}(x_{E,j}, x_{A_N,j})}, \frac{\sum_{j=1}^{M}\text{Contrast}'(x'_{E,j}, x'_{A_N,j}) \cdot IQM'_A(x'_{A_N,j}, y'_{A_N,j})}{\sum_{j=1}^{M}\text{Contrast}'(x'_{E,j}, x'_{A_N,j})}\right] \quad (46)$$

$$\text{index} = \arg\min_i(V_A[i])$$

$$S_A = V_A[\text{index}]$$

$$V_E = \left[\frac{\sum_{j=1}^{M}\text{Contrast}(x_{E,j}, x_{A_N,j}) \cdot IQM_E(x_{E,j}, y_{E,j})}{\sum_{j=1}^{M}\text{Contrast}(x_{E,j}, x_{A_N,j})}, \frac{\sum_{j=1}^{M}\text{Contrast}'(x'_{E,j}, x'_{A_N,j}) \cdot IQM'_E(x'_{E,j}, y'_{E,j})}{\sum_{j=1}^{M}\text{Contrast}'(x'_{E,j}, x'_{A_N,j})}\right] \quad (47)$$

$$S_E = V_E[\text{index}]$$

where $V_A$ is an array containing the pooled $IQM_A$ and $IQM'_A$ and $V_E$ is an array containing the pooled $IQM_E$ and $IQM'_E$. In that case, we select the approximation quality map with minimal quality and its corresponding edge quality map to compute $S_A$ and $S_E$ respectively. Other more complex combining of the edge maps is also possible. Also the system can easily be extended to combinations of more shifted images at input (i.e. arbitrary number of shifts instead on a single one).

For non map-based metrics like AD, we can compute as follows:

$S_A = a(IQM_A) + (1-a)(IQM'_A)$ and $S_E = a(IQM_E) + (1-a)(IQM'_E)$. with $0 <= a <= 1$.

For instance, we can set a=0.5 to compute the average.

$V_A = [IQM_A, IQM'_A]$, index=$\arg\min_i(V_A[i])$, $S_A = V_A$[index], $S_E = V_E$[index].

For $PSNR_{DWT}$ we compute:

$\text{mse}_A = a(IQM_A) + (1-a)(IQM'_A)$ and $\text{mse}_E = a(IQM_E) + (1-a)(IQM'_E)$. with $0 <= a <= 1$.

For instance, we can set a=0.5 to compute the average.

$V_A = [IQM_A, IQM'_A]$, index=$\arg\max_i(V_A[i])$, $\text{mse}_A = V_A$[index], $\text{mse}_E = V_E$[index].

$S_A = 10 \log_{10}((2^L(255))^2/\text{mse}_A)$ and $S_E = 10 \log_{10}((2^L(255))^2/\text{mse}_E)$.

where L is the number of decomposition levels in $PSNR_{DWT}$ and mse represents the mean squared error.

Other more complex combining of the edge maps is also possible. The system can also be extended to combinations of more shifted images (i.e. an arbitrary number of shifts instead of combining image quality metrics (IQMs) from only one shifted image pair X2 and Y2 and the un-shifted pair of images X and Y). Furthermore, the invention applies also even if the detailed sub-bands are ignored in the metric computation such as is the case of $PSNR_A$.

The systems illustrated in FIGS. 1 and 6-9 of the embodiments of the present invention include a general purpose or specialized computer having a CPU and a computer readable storage medium e.g., memory, DVD, CD-ROM, floppy, magnetic tape or other storage medium, having computer readable instructions stored thereon, for execution by the CPU, forming modules of the above noted systems as described above. Alternatively, the systems of FIGS. 1 and 6-9 can include specialized dedicated hardware or a combination of firmware and a specialized computer having a computer readable storage medium having computer readable instructions stored thereon for execution by the CPU for forming modules of these systems as described above. Each module of the systems of FIGS. 1 and 6-9 include a firmware or, alternatively, computer readable instructions stored in a computer readable storage medium such as memory device for execution by a processor.

The discrete wavelet domain image quality assessment system 1400 is realized on a computer equipped with software programs stored in the memory of the computer for enabling the features of the embodiments of the invention. Some or all of the functions of the system 1400 may also be implemented with an Application Specific Integrated Circuit (ASIC) or a number of ASICs.

FIG. 12 shows an exemplary hardware view 1700 of the discrete wavelet domain image quality assessment system 1400 including a Processor 1702 and a Computer Memory 1704 according to the embodiments of the invention.

The Processor 1702 may be any commercial processor capable of executing programs under an operating system such as, but not limited to, Linux, Microsoft Windows, or Mac Operating System 10 (OSX) for example, comprising a Central Processing Unit (CPU) 1706, a Network Input/Output (I/O) system 1708 and a Command Interface 1710.

The CPU 1706 may be any of a number of commercial processor implementations, including a multi-processor. The Network Input/Output (I/O) system 1708 provides an interface facility for receiving images for which quality assessment is to be performed. The Command Interface 1710 may include a keyboard, mouse, and visual interface, as well as removable storage devices, or any other hardware suitable for controlling a software configuration as well as the operations of discrete wavelet domain image quality assessment system 1400.

The Processor 1702 is connected to the Computer Memory 1704 which is preferably a non-transitory memory device such as dynamic memory (DRAM) capable of storing software programs and related data. Software modules, which include computer executable instructions for execution by the Processor 1702 are stored in the Computer Memory 1704, comprise: the IQM computation subsystem 100 which includes the first and second N-level DWT modules 102 and 104, to be also referred to as Transform modules 102 and 104 respectively, the first and second Detail Sub-band Aggregation Modules 106 and 108, the Contrast Map Generation Module 110, the Approximation Quality Map/Score Computation Module 112, the Edge Quality Map/Score Computation Module 114, the Pooling of Approximation Quality Map Module 116 the Pooling of Edge Map Module 118 and the Combination Module 120. Other software modules stored in the Computer memory 1704 include the Final Score Computation module 1106, the Approximation Quality Map Module 1402, the Common Pooling of Edge Quality Map Module 1404, and the Spatial Shift module 1104 which includes the Shift X module 1406 and the Shift Y module 1408.

The Computer Memory 1704 may also include a Cache 1712 for temporarily storing data such as the original and distorted images X and Y and the shifted versions X2 and Y2 which may be loaded from image databases through the Network I/O system 1708 as well as temporary results such as first and second contrast maps 1714 and 1716 generated by the Contrast Map Generation Module 110 for example.

Experimental Results

Table III shows accuracy results of various metric alternatives derived from $PSNR_A$ compared to $PSNR_A$ and PSNR on the LIVE image database. The description of each method is as follows: $QPSNR_A$ applies $PSNR_A$ at two spatial locations to form a near quincunx pattern. It averages the error values (mean squared error) obtained at these two spatial positions to compute the final dB score. There are two spatial positions: one at (0, 0) and one with a spatial shift of max(1, N/2-1) pixels horizontally and vertically.

$QMPSNR_A$ applies $PSNR_A$ at two spatial locations to form a near quincunx pattern. It keeps the largest error value (mean squared error) obtained at these two spatial positions to compute the final dB score. There are two spatial positions: one at (0, 0) and one with a spatial shift of max(1, N/2-1) pixels horizontally and vertically.

$EPSNR_A$ applies $PSNR_A$ at three spatial locations. It averages the error values (mean squared error) obtained at these three spatial positions to compute the final dB score. There are three spatial positions: one at (0, 0), one with a spatial shift of max(1, N/2-1) pixels horizontally only, and one with a spatial shift of max(1, N/2-1)) pixels horizontally and vertically.

$SPSNR_A$ performs the $PSNR_A$ but with a spatial shift of (1, 1) pixels.

TABLE III

LCC, SRCC AND RMSE VALUES AFTER NONLINEAR REGRESSION FOR THE LIVE IMAGE DATABASE

| Metric | LCC | SRCC | RMSE |
|---|---|---|---|
| PSNR | 0.8701 | 0.8756 | 13.4685 |
| $PSNR_A$ (1 location) | 0.9282 | 0.9302 | 10.1635 |
| $QPSNR_A$ (2 locations) | 0.9281 | 0.9308 | 10.1710 |
| $QMPSNR_A$ (2 locations) | 0.9279 | 0.9299 | 10.1883 |
| $EPSNR_A$ (3 locations) | 0.9287 | 0.9314 | 10.1331 |
| $SPSNR_A$ (1 location) | 0.9269 | 0.9299 | 10.2526 |

FIGS. 11(a) to 11(d) show four versions of a standard image "Image House" (image number 4.1.05) with a resolution of 256×256 available at http://sipi.usc.edu/database/database.php?volume=misc.

Figure 11A:
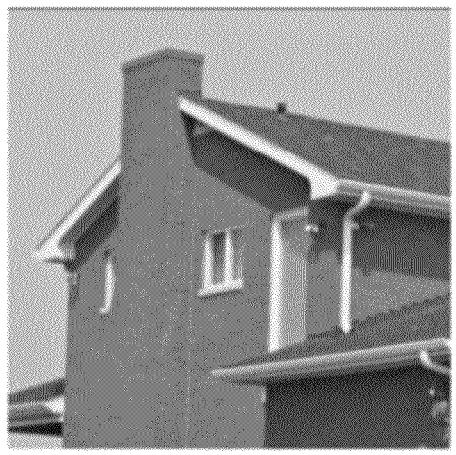
FIG. 11(a) shows a standard image "Image House" as an original reference image.

FIG. 11(a) shows the original (reference) image.

Figure 11B:
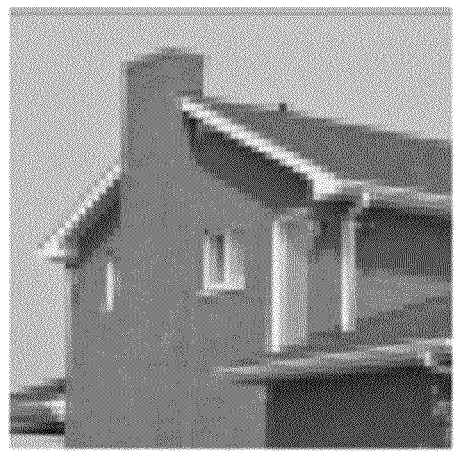
FIG. 11(b) shows a first distorted image created from the reference image of FIG. 11(a) with $2^{nd}$ row and $2^{nd}$ column of the 4×4DCT transformed image set to zero.

FIG. 11(b) shows a first distorted image created from the reference image with $2^{nd}$ row and $2^{nd}$ column of the 4×4DCT transformed image set to zero.

Figure 11C:
FIG. 11(c) shows a second distorted image created from the reference image of FIG. 11(a) with $3^{rd}$ row and $3^{rd}$ column of the 4×4DCT transformed image set to zero.

FIG. 11(c) shows a second distorted image created from the reference image with $3^{rd}$ row and $3^{rd}$ column of the 4×4DCT transformed image set to zero.

Figure 11D:
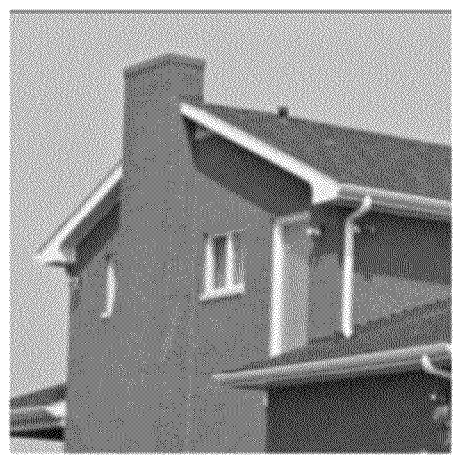
FIG. 11(d) shows a third distorted image created from the reference image of FIG. 11(a) with $4^{th}$ row and $4^{th}$ column of 4×4DCT transformed image set to zero.

FIG. 11(d) shows a third distorted image created from the reference image with $4^{th}$ row and $4^{th}$ column of 4×4DCT transformed image set to zero.

Table IV shows the final score of various metric alternatives derived from shifting $PSNR_A$ compared to $PSNR_A$ and PSNR on the reference image of FIG. 11(a) and the three distorted images below. The first distorted image of FIG. 11(b) is obtained by segmenting the image of FIG. 11(a) into 4×4 blocks, apply a 4×4 forward DCT transform, as defined in the H.264 standard, set to zero all frequency coefficients on the $2^{nd}$ row and $2^{nd}$ column of the forward DCT, and apply the 4×4 inverse DCT transform. The second distorted image of FIG. 11(c) is obtained in a similar manner but $3^{rd}$ row and $3^{rd}$ column are set to zero instead. The third distorted image of FIG. 11(d) is obtained in a similar manner but $4^{th}$ row and $4^{th}$ column are set to zero instead. We can visually observe that FIG. 11(b) has worse quality than FIG. 11(c) and that FIG. 11(c) has worse quality than FIG. 11(d). However, in Table VI, $PSNR_A$ gives a much higher score to FIG. 11(c) than FIG. 11(d) which is highly unacceptable. We can see that the metrics having a spatial shift do not have this problem and rank the image qualities properly (i.e. they rank the images in the right order from best quality to worst quality). This shows that the proposed metrics have increased robustness.

TABLE IV

METRIC VALUES FOR IMAGES OF FIG. 11(a) COMPARED TO FIGS. 11(b), 11(c), AND 11(d).

| Quality metric | FIG. 11(a) compared to 11(b) (i.e. $2^{nd}$ row and $2^{nd}$ column removed) | FIG. 11(a) compared to 11(c) (i.e. $3^{rd}$ row and $3^{rd}$ column removed) | FIG. 11(a) compared to 11(c) (i.e. $4^{th}$ row and $4^{th}$ column removed) |
|---|---|---|---|
| PSNR | 26.04 | 31.76 | 36.80 |
| $PSNR_A$ (1 location) | 26.93 | 64.20 | 45.42 |
| $QPSNR_A$ (2 locations) | 28.02 | 36.50 | 46.75 |

TABLE IV-continued

METRIC VALUES FOR IMAGES OF FIG. 11(a) COMPARED TO FIGS. 11(b), 11(c), AND 11(d).

| Quality metric | FIG. 11(a) compared to 11(b) (i.e. $2^{nd}$ row and $2^{nd}$ column removed) | FIG. 11(a) compared to 11(c) (i.e. $3^{rd}$ row and $3^{rd}$ column removed) | FIG. 11(a) compared to 11(c) (i.e. $4^{th}$ row and $4^{th}$ column removed) |
|---|---|---|---|
| $QMPSNR_A$ (2 locations) | 26.93 | 33.50 | 45.42 |
| $EPSNR_A$ (3 locations) | 28.16 | 35.79 | 47.12 |
| $SPSNR_A$ (1 location) | 29.47 | 33.50 | 48.67 |

In the embodiments described above, the transformation process is a Haar transform. It is understood that another transformation process may be also used, for example, a cosine transform, a sine transform, or a wavelet transform. Instead of Haar transform, alternatively, the transformation process can be a Daubechies transform.

Although specific embodiments of the invention have been described in detail, it should be understood that the described embodiments are illustrative and not restrictive. Various changes and modifications of the embodiments may be made within the scope of the following claims without departing from the scope of the invention in its broader aspect.

What is claimed is:

1. A method of computing a measure of quality for a distorted image Y, the measure characterizing a similarity between the image Y and an undistorted reference image X having the same number of rows and columns of pixels as the image Y, the method comprising: employing at least one processor for:
(a) transforming the distorted image Y and the undistorted reference image X by a transformation process to generate a transform of the distorted image Y and a transform of the undistorted reference image X respectively, the transformation process having a blindness property of not containing all information regarding an image to be transformed in a transform of the image, thus resulting in certain pixel patterns of the image leading to zero transform coefficients not to be recognized during the transformation process;
(b) spatially shifting pixels in the reference image X and the distorted image Y by a spatial shift, having the same predefined amount of pixels, to generate a spatially shifted version X2 of the reference image X and a spatially shifted version Y2 of the image Y respectively, the spatial shift being chosen so that the certain pixel patterns in images X and Y leading to zero transform coefficients upon applying the transformation process to the images X and Y would lead to non zero values for the transform coefficients upon applying the transformation process to the images X2 and Y2, thereby making the certain patterns detectable by using the transformation process applied to the spatially shifted versions X2 and Y2;
(c) transforming the spatially shifted version Y2 and the spatially shifted version X2 by the transformation process to generate a transform of the spatially shifted version Y2 and a transform of the spatially shifted version X2 respectively; and
(d) determining the measure of quality for the distorted image Y as a function of the transform of the distorted image Y, the transform of the undistorted reference image X, the transform of the spatially shifted version Y2, and the transform of the spatially shifted version X2.

2. The method of claim 1, wherein the step (b) further comprises:
dividing the pixels of the reference image X into blocks of W by W pixels; and
dividing the pixels of the distorted image Y into corresponding blocks of W by W pixels;
W being a smaller number than the number of rows and columns of pixels.

3. The method of claim 1, wherein the step (b) further comprises:
spatially shifting horizontally by a first predefined amount; or
spatially shifting vertically by a second predefined amount; or
spatially shifting horizontally and vertically by first and second predefined amounts respectively.

4. The method of claim 3, wherein the first predefined amount and the second predefined amount are the same.

5. The method of claim 2, wherein the W is equal to $2 \char`\^ N$, wherein an exponent N is a decomposition level of the transformation process.

6. The method of claim 3, wherein each of the first and second predefined amounts are the larger of 1 and (W/2−1).

7. The method of claim 3, wherein the first and second predefined amounts are odd numbers less than W.

8. The method of claim 1, wherein the transformation process is one of the following:
a cosine transform;
a sine transform;
a wavelet transform.

9. The method of claim 1, wherein the transformation process is a Haar transform or a Daubechies transform.

10. The method of claim 1, wherein the step (d) further comprises:
computing a first approximation image quality metric IQMA using the transform of the distorted image Y and the transform of the undistorted reference image X;
computing a second approximation image quality metric IQM'A using the transform of the spatially shifted version Y2 and the transform of the spatially shifted version X2; and
processing the first and second approximation image quality metrics IQMA and IQM'A to generate the measure of quality for the distorted image Y.

11. The method of claim 10, wherein the first and second approximation quality metrics IQMA and IQM'A respectively are first and second approximation quality maps, and the step (d) further comprises:
creating first and second contrast maps of the reference image X and of the spatially shifted version X2 respectively;
performing weighted pooling of the first and second approximation quality maps using the first and second contrast maps respectively to produce an approximation quality score SA; and
determining the measure of quality using the approximation quality score SA.

12. The method of claim 10, wherein the step (d) further comprises:
(i) computing a first edge image quality metric IQME using the transform of the distorted image Y and the transform of the undistorted reference image X;
(ii) computing a second edge image quality metric IQM'E using the transform of the spatially shifted version Y2 and the transform of the spatially shifted version X2; and (iii) determining the measure of quality for the distorted image Y as the function of IQMA, IQM'A, IQME and IQM'E.

13. The method of claim 12, wherein the step (iii) further comprises:
processing the first and second approximation image quality metrics IQMA and IQM'A to generate an approximation quality score SA;
processing the first and second edge quality metrics IQME and IQM'E to generate an edge quality score SE; and
determining the measure of quality for the distorted image Y as a function of the approximation quality score SA and the edge quality score SE.

14. The method of claim 13, wherein the measure of quality is computed as a final score SF=beta * SA+(1−beta) * SE, with beta value ranging from 0 to 1.

15. The method of claim 12, wherein the first and second approximation quality metrics IQMA and IQM'A respectively are first and second approximation quality maps, wherein further the first and second edge quality metrics IQME and IQM'E respectively are first and second edge quality maps, and the step (d) further comprises:
(d1) creating first and second contrast maps of the reference image X and of the spatially shifted version X2 respectively;
(d2) performing weighted pooling of the first and second approximation quality maps using the first and second contrast maps respectively to produce an approximation quality score SA;
(d3) performing weighted pooling of the first and second edge quality maps using the first and second contrast maps respectively to produce an edge quality score SE; and
(d4) processing the approximation quality score SA and the edge quality score SE to determine the measure of quality.

16. The method of claim 15, the step of creating first and second contrast maps further comprises assigning values to pixels of the first and second approximation quality maps, and the first and second edge maps of the reference image X and the spatially shifted version X2 according to their respective importance to a human visual system.

17. The method of claim 15, wherein the step (d2) further comprises one of averaging the first approximation quality map and the second approximation quality map, and of taking the minimum of the first approximation quality map and the second approximation quality map to produce the approximation quality score SA.

18. A system for computing a measure of quality for a distorted image Y, the measure characterizing a similarity between the image Y and an undistorted reference image X having the same number of rows and columns of pixels as the image Y, the system comprising:
a processor;
a non-transitory computer readable storage medium having computer readable instructions stored thereon for execution by the processor, causing the processor to:
(a) transform the distorted image Y and the undistorted reference image X by a transformation process to generate a transform of the distorted image Y and a transform of the undistorted reference image X respectively, the transformation process having a blindness property of not containing all information regarding an image to be transformed in a transform of the image, thus resulting in certain patterns of the image leading to zero transform coefficients not to be recognized during the transformation process;

(b) spatially shift pixels in the reference image X and the distorted image Y by a spatial shift, having the same predefined amount of pixels, to generate a spatially shifted version X2 of the reference image X and a spatially shifted version Y2 of the image Y respectively, the spatial shift being chosen so that the certain pixel patterns in images X and Y leading to zero transform coefficients upon applying the transformation process to the images X and Y would lead to non zero values for the transform coefficients upon applying the transformation process to the images X2 and Y2, thereby making, the certain patterns detectable by using the transformation process applied to the spatially shifted versions X2 and Y2;
(c) transform the spatially shifted version Y2 and the spatially shifted version X2 by the transformation process to generate a transform of the spatially shifted version Y2 and a transform of the spatially shifted version X2 respectively; and
(d) determine the measure of quality for the distorted image Y as a function of the transform of the distorted image Y, the transform of the undistorted reference image X, the transform of the spatially shifted version Y2, and the transform of the spatially shifted version X2.

19. The system of claim 18, wherein the computer readable instructions further cause the processor to:
divide the pixels of the reference image X into blocks of W by W pixels, W being a smaller number than the number of rows and columns of pixels; and
divide the pixels of the distorted image Y into corresponding blocks of W by W pixels.

20. The system of claim 19, wherein the W is equal to 2 ^ N, wherein an exponent N is a decomposition level of the transformation process.

21. The system of claim 18, wherein the computer readable instructions further cause the processor to:
spatially shift horizontally by a first predefined amount; or
spatially shift vertically by a second predefined amount; or
spatially shift horizontally and vertically by first and second predefined amounts respectively.

22. The system of claim 21, wherein the first predefined amount and the second predefined amount are the same.

23. The system of claim 21, wherein each of the first and second predefined amounts are the larger of 1 and (W/2−1).

24. The system of claim 21, wherein the first and second predefined amounts are odd numbers less than W.

25. The system of claim 18, wherein the transformation process is one of the following:
a cosine transform;
a sine transform;
a wavelet transform.

26. The system of claim 18, wherein the transformation process is a Haar transform or a Daubechies transform.

27. The system of claim 18, wherein the computer readable instructions further cause the processor to:
compute a first approximation image quality metric IQMA using the transform of the distorted image Y and the transform of the undistorted reference image X;
compute a second approximation image quality metric IQM'A using the transform of the spatially shifted version Y2 and the transform of the spatially shifted version X2; and
process the first and second approximation image quality metrics IQMA and IQM'A to generate the measure of quality for the distorted image Y.

28. The system of claim 27, wherein the first and second approximation quality metrics IQMA and IQM'A respectively are first and second approximation quality maps, and wherein the computer readable instructions further cause the processor to:
- create first and second contrast maps of the reference image X and of the spatially shifted version X2 respectively;
- perform weighted pooling of the first and second approximation quality maps using the first and second contrast maps respectively to produce an approximation quality score SA; and
- determine the measure of quality using the approximation quality score SA.

29. The system of claim 27, wherein the computer readable instructions further cause the processor to:
(i) compute a first edge image quality metric IQME using the transform of the distorted image Y and the transform of the undistorted reference image X;
(ii) compute a second edge image quality metric IQM'E using the transform of the spatially shifted version Y2 and the transform of the spatially shifted version X2; and
(iii) determine the measure of quality for the distorted image Y as the function of IQMA, IQM'A, IQME and IQM'E.

30. The system of claim 29, wherein the computer readable instructions further cause the processor to:
- process the first and second approximation image quality metrics IQMA and IQM'A to generate an approximation quality score SA;
- process the first and second edge quality metrics IQME and IQM'E to generate an edge quality score SE; and
- determine the measure of quality for the distorted image Y as a function of the approximation quality score SA and the edge quality score SE.

31. The system of claim 30, wherein the measure of quality is computed as a final score SF=beta * SA+(1−beta) * SE, with beta value ranging from 0 to 1.

32. The system of claim 29, wherein the first and second approximation quality metrics IQMA and IQM'A respectively are first and second approximation quality maps, wherein further the first and second edge quality metrics IQME and IQM'E respectively are first and second edge quality maps, and wherein the computer readable instructions further cause the processor to:
- create first and second contrast maps of the reference image X and of the spatially shifted version X2 respectively;
- perform weighted pooling of the first and second approximation quality maps using the first and second contrast maps respectively to produce an approximation quality score SA;
- perform weighted pooling of the first and second edge quality maps using the first and second contrast maps respectively to produce an edge quality score SE; and
- process the approximation quality score SA and the edge quality score SE to determine the measure of quality.

33. The system of claim 32, wherein the computer readable instructions further cause the processor to assign values to pixels of the first and second approximation quality maps, and the first and second edge maps of the reference image X and the spatially shifted version X2 according to their respective importance to a human visual system.

34. The system of claim 32, wherein the computer readable instructions further cause the processor to perform one of averaging the first approximation quality map and the second approximation quality map, and of taking the minimum of the first approximation quality map and the second approximation quality map to produce the approximation quality score SA.

* * * * *